(12) United States Patent
Ota et al.

(10) Patent No.: US 9,499,678 B2
(45) Date of Patent: *Nov. 22, 2016

(54) FLUORORUBBER COMPOSITION

(71) Applicant: DAIKIN INDUSTRIES, LTD., Osaka-shi, Osaka (JP)

(72) Inventors: Daisuke Ota, Settsu (JP); Akinori Ueda, Settsu (JP); Yuu Kadowaki, Settsu (JP); Mayuko Taeda, Settsu (JP); Masanori Kitaichi, Settsu (JP); Kazuhiro Yamamura, Settsu (JP); Michiko Doi, Settsu (JP); Shoji Fukuoka, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/380,197

(22) PCT Filed: Feb. 22, 2013

(86) PCT No.: PCT/JP2013/055611
§ 371 (c)(1),
(2) Date: Aug. 21, 2014

(87) PCT Pub. No.: WO2013/125735
PCT Pub. Date: Aug. 29, 2013

(65) Prior Publication Data
US 2015/0031822 A1    Jan. 29, 2015

Related U.S. Application Data

(60) Provisional application No. 61/602,806, filed on Feb. 24, 2012.

(51) Int. Cl.
*C08K 3/04* (2006.01)

(52) U.S. Cl.
CPC ..................... *C08K 3/04* (2013.01)

(58) Field of Classification Search
CPC ....................................... C08K 3/04
See application file for complete search history.

(56) References Cited

U.S. PATENT DOCUMENTS

| | | | |
|---|---|---|---|
| 4,158,678 A | 6/1979 | Tatemoto et al. | |
| 4,243,770 A | 1/1981 | Tatemoto et al. | |
| 4,543,394 A | 9/1985 | Finlay et al. | |
| 4,861,836 A | 8/1989 | Tatemoto et al. | |
| 4,962,236 A | 10/1990 | Tatemoto et al. | |
| 4,988,562 A | 1/1991 | Ryoke et al. | |
| 5,198,136 A | 3/1993 | Tatemoto et al. | |
| 5,508,355 A * | 4/1996 | Toda | C08K 5/0025 525/326.3 |
| 6,232,390 B1 | 5/2001 | Ono et al. | |
| 6,252,006 B1 | 6/2001 | Tomihashi et al. | |
| 6,346,587 B1 | 2/2002 | Kruger et al. | |
| 9,006,328 B2 * | 4/2015 | Ota | C08K 5/0025 524/495 |
| 9,045,614 B2 * | 6/2015 | Ota | C08K 5/0025 |
| 9,068,053 B2 * | 6/2015 | Yano | B29D 22/02 |
| 2001/0031815 A1 | 10/2001 | Nakano et al. | |
| 2005/0085576 A1 | 4/2005 | Kinoshita et al. | |
| 2008/0248225 A1 | 10/2008 | Bandyopadhyay | |
| 2008/0306196 A1 | 12/2008 | Irie et al. | |
| 2009/0263603 A1 | 10/2009 | Ota et al. | |
| 2010/0004415 A1 | 1/2010 | Maeda et al. | |
| 2010/0051259 A1 * | 3/2010 | Pessin | E21B 33/127 166/120 |
| 2010/0216933 A1 | 8/2010 | Wang | |
| 2011/0200777 A1 | 8/2011 | Doi et al. | |
| 2011/0269911 A1 | 11/2011 | Morita et al. | |
| 2011/0277918 A1 * | 11/2011 | Lee | B29C 33/405 156/156 |
| 2012/0067706 A1 | 3/2012 | Terada et al. | |
| 2012/0077924 A1 | 3/2012 | Ota et al. | |
| 2012/0077926 A1 | 3/2012 | Ota et al. | |
| 2012/0077927 A1 | 3/2012 | Ota et al. | |
| 2012/0077938 A1 | 3/2012 | Terada et al. | |
| 2012/0077939 A1 | 3/2012 | Ota et al. | |
| 2012/0095150 A1 | 4/2012 | Ota et al. | |

(Continued)

FOREIGN PATENT DOCUMENTS

| | | |
|---|---|---|
| CN | 1989202 A | 6/2007 |
| DE | 19812755 A1 | 9/1999 |

(Continued)

OTHER PUBLICATIONS

Communication dated Mar. 6, 2015 from the European Patent Office in application No. 13739075.3.

(Continued)

*Primary Examiner* — Nicole M Buie-Hatcher
(74) *Attorney, Agent, or Firm* — Sughrue Mion, PLLC

(57) ABSTRACT

A fluororubber composition which includes a fluororubber (A) and a carbon black (B). The fluororubber (A) is a vinylidene fluoride-based fluororubber including a structural unit (VdF unit) derived from vinylidene fluoride and a structural unit derived from at least one monomer selected from the group consisting of hexafluoropropylene (HFP), 2,3,3,3-tetrafluoro propylene, and perfluoro(alkyl vinyl ether) (PAVE). The molar ratio of the VdF unit to the structural unit derived from at least one monomer selected from the group consisting of HFP, 2,3,3,3-tetrafluoro propylene, and PAVE is 50/50 to 78/22. The fluororubber composition has a difference δG' (G' (1%)-G' (100%)) of not lower than 120 kPa and not higher than 3,000 kPa, where G' (1%) denotes a modulus of shearing elasticity at a dynamic strain of 1%, G' (100%) denotes a modulus of shearing elasticity at a dynamic strain of 100%, and G' (1%) and G' (100%) are determined by a dynamic viscoelasticity test.

6 Claims, 2 Drawing Sheets

(56) References Cited

U.S. PATENT DOCUMENTS

| | | | |
|---|---|---|---|
| 2012/0095151 A1 | 4/2012 | Terada et al. | |
| 2012/0259054 A1 | 10/2012 | Okutsu | |
| 2014/0228482 A1 | 8/2014 | Ota et al. | |
| 2014/0288226 A1 | 9/2014 | Ota et al. | |
| 2015/0017364 A1 | 1/2015 | Ota et al. | |
| 2015/0133592 A1* | 5/2015 | Miyasaka | B60C 1/00 524/495 |
| 2015/0330537 A1 | 11/2015 | Ota et al. | |

FOREIGN PATENT DOCUMENTS

| | | |
|---|---|---|
| EP | 0683149 A2 | 11/1995 |
| EP | 2258767 A1 | 12/2010 |
| JP | 53-3495 | 1/1978 |
| JP | 53-125491 | 11/1978 |
| JP | 60-55050 A | 3/1985 |
| JP | 63-159336 A | 7/1988 |
| JP | 1-106330 A | 4/1989 |
| JP | 1-153745 A | 6/1989 |
| JP | 2-124913 A | 5/1990 |
| JP | 2-308841 A | 12/1990 |
| JP | 3-122153 A | 5/1991 |
| JP | 4-359946 A | 12/1992 |
| JP | 6-25500 A | 2/1994 |
| JP | 7-11087 A | 1/1995 |
| JP | 7-134469 A | 5/1995 |
| JP | 7-196881 A | 8/1995 |
| JP | 8-3017 B2 | 1/1996 |
| JP | 10-219062 A | 8/1998 |
| JP | 11-193332 A | 7/1999 |
| JP | 11-344165 A | 12/1999 |
| JP | 2001-114964 A | 4/2001 |
| JP | 2001-261846 A | 9/2001 |
| JP | 2002-192528 A | 7/2002 |
| JP | 2003-13041 A | 1/2003 |
| JP | 2004-26897 A | 1/2004 |
| JP | 2004-123878 A | 4/2004 |
| JP | 2005-113017 A | 4/2005 |
| JP | 2006-70132 A | 3/2006 |
| JP | 2006-513304 A | 4/2006 |
| JP | 2007-137941 A | 6/2007 |
| JP | 2008-184496 A | 8/2008 |
| JP | 2009-224048 A | 10/2009 |
| JP | 2009-227780 A | 10/2009 |
| JP | 2009-256455 A | 11/2009 |
| JP | WO 2010007699 A1 * | 1/2010 ............ C08K 5/13 |
| JP | 2010-24339 A | 2/2010 |
| JP | 2010-285526 A | 12/2010 |
| JP | 2011-148902 A | 8/2011 |
| JP | 2011-522921 A | 8/2011 |
| JP | 2012-519221 A | 8/2012 |
| JP | 2013-14640 A | 1/2013 |
| JP | 2013-173929 A | 9/2013 |
| JP | 2013-173930 A | 9/2013 |
| JP | 2013-175462 A | 9/2013 |
| WO | 95/15359 A1 | 6/1995 |
| WO | 98/07784 A1 | 2/1998 |
| WO | 03/076535 A1 | 9/2003 |
| WO | 2004/067618 A1 | 8/2004 |
| WO | 2007/135937 A1 | 11/2007 |
| WO | 2007/148759 A1 | 12/2007 |
| WO | WO 2010101304 A1 * | 9/2010 ............ C08F 214/22 |
| WO | 2012/026006 A1 | 3/2012 |
| WO | 2012/026007 A1 | 3/2012 |
| WO | 2012/026534 A1 | 3/2012 |
| WO | 2012/026552 A1 | 3/2012 |
| WO | 2012/026553 A1 | 3/2012 |
| WO | 2012/026554 A1 | 3/2012 |
| WO | 2012/026555 A1 | 3/2012 |
| WO | 2012/026556 A1 | 3/2012 |
| WO | 2012/026558 A1 | 3/2012 |
| WO | 2012/026559 A1 | 3/2012 |
| WO | 2013/108935 A1 | 7/2013 |
| WO | 2013/108936 A1 | 7/2013 |
| WO | 2013/125731 A1 | 8/2013 |
| WO | 2013/125735 A1 | 8/2013 |
| WO | 2013/125736 A1 | 8/2013 |

OTHER PUBLICATIONS

Communication dated Mar. 3, 2015 from the European Patent Office in application No. 13738608.2.
Communication dated Jul. 21, 2015 from the European Patent Office in counterpart application No. 13752402.1.
Communication dated Jul. 21, 2015 from the European Patent Office in counterpart application No. 13751700.9.
International Search Report and Written Opinion of the International Searching Authority dated Mar. 19, 2013 for PCT/JP2013/051512.
International Search Report and Written Opinion of the International Searching Authority dated Mar. 19, 2013 for PCT/JP2013/051513.
International Search Report and Written Opinion of the International Searching Authority dated Jun. 4, 2013 for PCT/JP2013/055603.
International Search Report and Written Opinion of the International Searching Authority dated Jun. 4, 2013 for PCT/JP2013/055611.
International Search Report and Written Opinion of the International Searching Authority dated May 14, 2013 for PCT/JP2013/055612.
Communication dated Dec. 8, 2014, issued by the Japanese Patent Office in related Japanese application No. 2014-506387.
"Physical & Chemical Properties", Anonymous, Jan. 20, 2006 (Jan. 20, 2006), XP55248779, 7 pages total.

* cited by examiner (a)

(b)

(c)

FLUORORUBBER COMPOSITION

CROSS-REFERENCE TO RELATED APPLICATION

This application is a National Stage of International Application No. PCT/JP2013/055611 filed Feb. 22, 2013, claiming priority based on U.S. Provisional Application No. 61/602,806 filed Feb. 24, 2012, the contents of all of which are incorporated herein by reference in their entirety.

TECHNICAL FIELD

The present invention relates to a fluororubber composition which can give a crosslinked fluororubber article having excellent tensile properties at high temperatures.

BACKGROUND ART

Fluororubbers are known to exhibit excellent chemical resistance, oil resistance, heat resistance, cold resistance and the like.

Patent Literature 1 proposes a bromine-containing fluororubber composition having improved compression set resistance even after being heated to a high temperature.

Patent Literature 2 proposes a vulcanized fluororubber composition which gives a crosslinked article having similarly excellent compression set resistance, heat resistance, oil resistance and chemical resistance to a conventional vulcanized fluororubber and achieving an extremely high tensile strength.

Patent Literature 3 proposes a fluorine-containing elastomer which can give a vulcanized product having excellent elongation during breaking at a high temperature such as 100° C. and excellent compression set characteristics at a low temperature such as 0° C.

As a composition having excellent high-temperature strength, Patent Literature 4 proposes a fluororubber composition obtained by incorporating 5 to 100 parts by weight of a fluorine-containing thermoplastic elastomer in 100 parts by weight of a fluororesin (b).

CITATION LIST

Patent Literature

[Patent Literature 1] Japanese Patent Application Publication No. S60-55050
[Patent Literature 2] Japanese Patent Application Publication No. H3-122153
[Patent Literature 3] Japanese Patent Application Publication No. 2008-184496
[Patent Literature 4] Japanese Patent Application Publication No. H06-25500

SUMMARY OF INVENTION

Technical Problem

An objective of the present invention is to provide a fluororubber composition which can provide a crosslinked fluororubber article having excellent tensile properties at high temperatures.

Solution to Problem

The present invention relates to a fluororubber composition comprising: a fluororubber (A) and carbon black (B).

The fluororubber (A) is a vinylidene fluoride-based fluororubber comprising a structural unit (VdF unit) derived from vinylidene fluoride and a structural unit derived from at least one monomer selected from the group consisting of hexafluoropropylene (HFP), 2,3,3,3-tetrafluoro propylene, and perfluoro(alkyl vinyl ether) (PAVE). The molar ratio of the VdF unit to the structural unit derived from at least one monomer selected from the group consisting of HFP, 2,3,3,3-tetrafluoro propylene, and PAVE is 50/50 to 78/22. The fluororubber composition has a value of $\delta G'$ ($G'$ (1%)-$G'$ (100%)), which is the difference between the modulus of shearing elasticity at a dynamic strain of 1% ($G'(1\%)$) and the modulus of shearing elasticity at a dynamic strain of 100% ($G'$ (100%)), of not lower than 120 kPa and not higher than 3,000 kPa in a dynamic viscoelasticity test (measurement frequency: 1 Hz, measurement temperature: 100° C.) carried out on an unvulcanised rubber using a rubber process analyzer (RPA).

The present invention also relate to a crosslinked fluororubber article obtainable by crosslinking of the fluororubber composition.

Advantageous Effects of Invention

The present invention can provide a fluororubber composition which can give a crosslinked article having excellent tencile properties at high temperatures.

DESCRIPTION OF EMBODIMENTS

(A) Fluororubber

Figure 1:
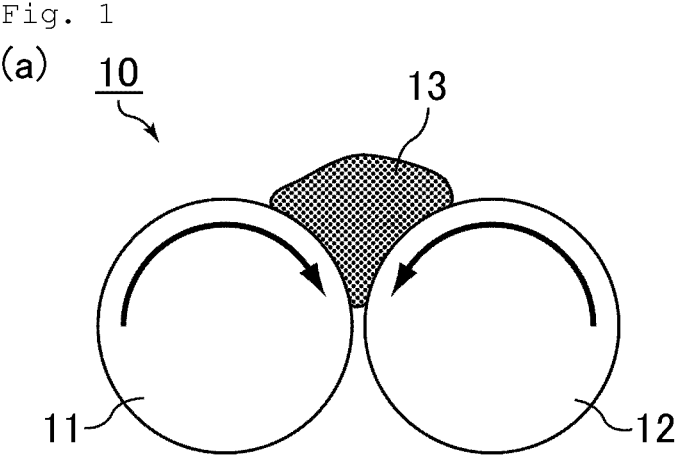
FIG. 1 is a diagram showing a schematic view of the mixing method used in step (2-1) and step (2-2).
Figure 1:
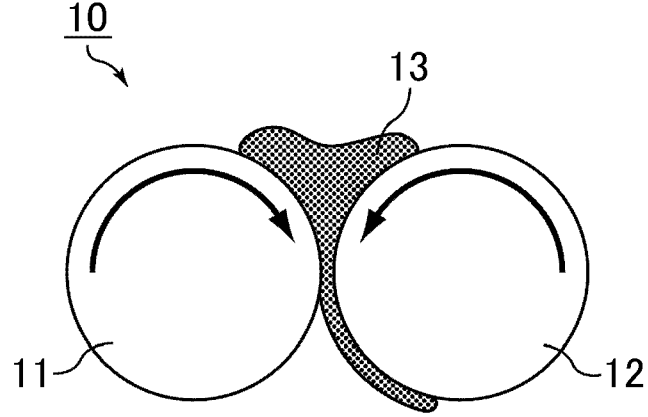
Figure 1:
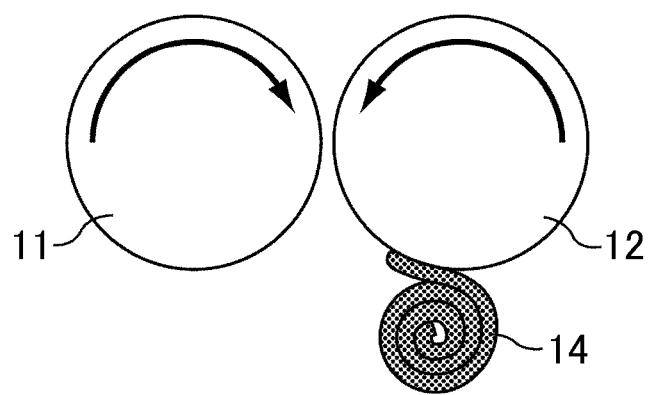

A fluororubber (A) forming the fluororubber composition of the present invention is a vinylidene fluoride-based fluororubber comprising a structural unit (VdF unit) derived from vinylidene fluoride (VdF) and a structural unit (hereinafter, also referred to as the second monomer unit) derived from at least one monomer (hereinafter, also referred to as the second monomer) selected from the group consisting of hexafluoropropylene (HFP), 2,3,3,3-tetrafluoro propylene ($CH_2=CFCF_3$), and perfluoro (alkyl vinyl ether) (PAVE). The molar ratio of the VdF unit to the structural unit derived from at least one monomer selected from the group consisting of HFP, 2,3,3,3-tetrafluoro propylene, and PAVE is 50/50 to 78/22, In cases where the ratio of the VdF unit to the second monomer unit is within the above range, the crosslinked fluororubber article obtained from the fluororubber composition of the present invention is excellent in tensile properties at high temperatures.

The VdF unit/the second monomer unit (molar ratio) is preferably 52/48 to 77/23, and more preferably 55/45 to 75/25.

The amount of the VdF unit is preferably 50 mol % or more, more preferably 52 mol % or more, and still more preferably 55 mol % or more, relative to the amount of the total structural units. The amount of the VdF unit is preferably 78 mol % or less, more preferably 77 mol % or less, still more preferably 75 mol % or less, particularly preferably 74 mol % or less, and more particularly preferably 70 mol % or less, relative to the amount of the total structural units.

The amount of the second monomer unit is preferably 22 mol % or more, more preferably 23 mol % or more, still more preferably 25 mol % or more, particularly preferably 26 mol % or more, and more particularly preferably 30 mol % or more, relative to the amount of the total structural units. The amount of the second monomer unit is preferably 50 mol % or less, more preferably 48 mol % or less, and still more preferably 45 mol % or less, relative to the amount of the total structural units.

As the aforementioned PAVE, perfluoro (methyl vinyl ether) (PMVE) and perfluoro (propyl vinyl ether) (PPVE) are more preferred, and PMVE is especially preferred.

As the second monomer, at least one monomer selected from the group consisting of hexafluoropropylene and 2,3,3,3-tetrafluoro propylene is preferred.

The fluororubber (A) may comprise a structural unit derived from a monomer other than VdF and the second monomer. A monomer other than VdF and the second monomer is not particularly limited as long as it is copolymerizable with VdF and the second monomer, and examples thereof include fluorine-containing monomers such as tetrafluoroethylene (TFE), chlorotrifluoroethylene (CTFE), trifluoroethylene, trifluoropropylene, pentafluoropropylene, trifluorobutene, tetrafluoroisobutene, hexafluoroisobutene, vinyl fluoride, iodine-containing fluorinated vinyl ethers, and fluorine-containing monomers (1), provided that 2,3,3,3-tetrafluoropropylene is excluded, represented by general formula (1):

$$CH_2=CFR_f \quad (1)$$

(where, $R_f$ is a straight chain or branched chain fluoroalkyl group having 1 to 12 carbon atoms); fluorine-free monomers such as ethylene (Et), propylene (Pr) or an alkyl vinyl ether, monomers having a crosslinkable group (a curing site) and reactive emulsifying agents. One or more of these monomers and compounds may be used.

In addition, the aforementioned monomer other than VdF and the second monomer can be perfluorovinyl ether represented by the formula (2):

$$CF_2=CFOCF_2OR_f^1 \quad (2)$$

(where, $R_f^1$ is a straight chain or branched chain perfluoroalkyl group having 1 to 6 carbon atoms, a cyclic perfluoroalkyl group having 5 to 6 carbon atoms or a straight chain or branched chain perfluorooxyalkyl group having 2 to 6 carbon atoms and containing 1 to 3 oxygen atoms), and $CF_2=CFOCF_2OCF_3$, $CF_2=CFOCF_2OCF_2CF_3$ or $CF_2=CFOCF_2OCF_2CF_2OCF_3$ is preferably used.

The fluorine-containing monomer (1) represented by the formula (1) is preferably a monomer in which $R_f$ is a straight chain fluoroalkyl group, and more preferably a monomer in which $R_f$ is a straight chain perfluoroalkyl group. The number of carbon atoms in $R_f$ is preferably 1 to 6. Examples of the above-mentioned fluorine-containing monomer (1) represented by the formula (1) include $CH_2=CFCF_2CF_3$, $CH_2=CFCF_2CF_2CF_3$, and $CH_2=CFCF_2CF_2CF_3$.

As the fluororubber (A), it is possible to preferably use a material obtained by copolymerizing a monomer having a crosslinkable group with VdF and the second monomer. A monomer having a crosslinkable group should be one able to introduce a crosslinkable group that is suitable for the production method or crosslinking system, for example a publicly known polymerizable compound or chain transfer agent containing an iodine atom, a bromine atom, a carbon-carbon double bond, a cyano group, a carboxyl group, a hydroxyl group, an amino group, an ester group and the like.

Preferred examples of monomers having crosslinkable groups include a compound represented by General formula (3):

$$CY_2^1=CY^2R_f^2X^1 \quad (3)$$

(where, $Y^1$ and $Y^2$ are the same as or different from each other, and each denotes a fluorine atom, a hydrogen atom or —$CH_3$; $R_f^2$ denotes a straight chain or branched chain fluorine-containing alkylene group which may have one or more ether bonds, which may have an aromatic ring and in which some or all of the hydrogen atoms are substituted by fluorine atoms; and $X^1$ denotes an iodine atom or a bromine atom). Specifically, it is possible to use, for example, an iodine-containing monomer or bromine-containing monomer represented by general formula (4):

$$CY_2^1=CY^2R_f^3CHR^1—X^1 \quad (4)$$

(where, $Y^2$, $Y^2$ and $X^1$ are the same as mentioned above, $R_f^3$ denotes a straight chain or branched chain fluorine-containing alkylene group which may have one or more ether bonds and in which some or all of the hydrogen atoms are substituted by fluorine atoms, that is, a straight chain or branched chain fluorine-containing alkylene group in which some or all of the hydrogen atoms are substituted by fluorine atoms, a straight chain or branched chain fluorine-containing oxyalkylene group in which some or all of the hydrogen atoms are substituted by fluorine atoms or a straight chain or branched chain fluorine-containing polyoxyalkylene group in which some or all of the hydrogen atoms are substituted by fluorine atoms; and $R^2$ denotes a hydrogen atom or a methyl group), or an iodine-containing monomer or bromine-containing monomer represented by general formulae (5) to (22):

$$CY_2^4=CY^4(CF_2)_n—X^1 \quad (5)$$

(where, the $Y^4$ groups may be the same or different, and are hydrogen atoms or fluorine atoms, and n is an integer between 1 and 8)

$$CF_2=CFCF_2R_f^4—X^1 \quad (6)$$

(where,
[Formula 1]
$R_f^4$ is —$(OCF_2)_n$— or —$(OCF(CF_3))_n$—
and n is an integer between 0 and 5)

$$CF_2=CFCF_2(OCF(CF_3)CF_2)_m(OCH_2CF_2CF_2)_n OCH_2CF_2—X^1 \quad (7)$$

(where, m is an integer between 0 and 5 and n is an integer between 0 and 5)

$$CF_2=CFCF_2(OCH_2CF_2CF_2)_m(OCF(CF_3)CF_2)_nOCF (CF_3)—X^1 \quad (8)$$

(where, m is an integer between 0 and 5 and n is an integer between 0 and 5)

$$CF_2=CF(OCF_2CF(CF_3))_mO(CF_2)_n—X^1 \quad (9)$$

(where, m is an integer between 0 and 5 and n is an integer between 1 and 8)

$$CF_2=CF(OCF_2CF(CF_3))_m—X^1 \quad (10)$$

(where, m is an integer between 1 and 5)

$$CF_2=CFOCF_2(CF(CF_3)OCF_2)_nCF(—X^1)CF_3 \quad (11)$$

(where, n is an integer between 1 and 4)

$$CF_2=CFO(CF_2)_nOCF(CF_3)—X^1 \quad (12)$$

(where, n is an integer between 2 and 5)

$$CF_2=CFO(CF_2)_n-(C_6H_4)-X^1 \quad (13)$$

(where, n is an integer between 1 and 6)

$$CF_2=CF(OCF_2CF(CF_3))_nOCF_2CF(CF_3)-X^1 \quad (14)$$

(where, n is an integer between 1 and 2)

$$CH_2=CFCF_2O(CF(CF_3)CF_2O)_nCF(CF_3)-X^1 \quad (15)$$

(where, n is an integer between 0 and 5)

$$CF_2=CFO(CF_2CF(CF_3)O)_m(CF_2)_n-X^1 \quad (16)$$

(where, m is an integer between 0 and 5 and n is an integer between 1 and 3)

$$CH_2=CFCF_2OCF(CF_3)OCF(CF_3)-X^1 \quad (17)$$

$$CH_2=CFCF_2OCH_2CF_2-X^1 \quad (18)$$

$$CF_2=CFO(CF_2CF(CF_3)O)_mCF_2CF(CF_3)-X^1 \quad (19)$$

(where, m is an integer of 0 or higher)

$$CF_2=CFOCF(CF_3)CF_2O(CF_2)_n-X^1 \quad (20)$$

(where, n is an integer of 1 or higher)

$$CF_2=CFOCF_2OCF_2CF(CF_3)OCF_2-X^1 \quad (21)$$

$$CH_2=CH-(CF_2)_nX^1 \quad (22)$$

(where, n is an integer between 2 and 8)
(in general formulae (5) to (22), $X^1$ is the same as mentioned above),
and it is possible to use these in isolation or as an arbitrary combination thereof.

The iodine-containing monomer or bromine-containing monomer represented by general formula (4) is preferably an iodine-containing fluorinated vinyl ether represented by general formula (23):

[Formula 2]

$$I(CH_2CF_2CF_2O)_m(\overset{CF_3}{\underset{|}{C}FCF_2O})_nCF=CF_2 \quad (23)$$

(where, m is an integer between 1 and 5 and n is an integer between 0 and 3).

More specifically, it is possible to use

[Formula 3]

$$ICH_2CF_2CF_2OCF=CF_2, \quad I(CH_2CF_2CF_2O)_2CF=CF_2,$$

$$I(CH_2CF_2CF_2O)_3CF=CF_2, \quad ICH_2CF_2CF_2O\overset{CF_3}{\underset{|}{C}F}CF_2OCF=CF_2,$$

$$ICH_2CF_2CF_2O(\overset{CF_3}{\underset{|}{C}FCF_2O})_2CF=CF_2$$

and the like, but of these, $ICH_2CF_2CF_2OCF=CF_2$ is preferred.

Specifically, the iodine-containing monomer or bromine-containing monomer represented by general formula (5) is preferably $ICF_2CF_2CF=CH_2$ or $I(CF_2CF_2)_2CF=CH_2$.

Specifically, the iodine-containing monomer or bromine-containing monomer represented by general formula (9) is preferably $I(CF_2CF_2)_2OCF=CF_2$.

Specifically, the iodine-containing monomer or bromine-containing monomer represented by general formula (22) is preferably $CH_2=CHCF_2CF_2I$ or $I(CF_2CF_2)_2CH=CH_2$.

In addition, a bis-olefin compound represented by the formula: $R^2R^3C=CR^4-Z-CR^5=CR^6R^7$
(where, $R^2$, $R^3$, $R^4$, $R^5$, $R^6$ and $R^7$ may be the same or different, and each denotes H or an alkyl group having 1 to 5 carbon atoms, and Z denotes a straight chain or branched-chain alkylene or cycloalkylene group having 1 to 18 carbon atoms, which may contain an oxygen atom and which is preferably at least partially fluorinated, or a (per)fluoropolyoxyalkylene group) is also preferred as a monomer having a crosslinkable group. Moreover, "(per)fluoropolyoxyalkylene group" means "a fluoropolyoxyalkylene group or a perfluoropolyoxyalkylene group" in the present specification.

Z is preferably a (per)fluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per)fluoropolyoxyalkylene) fluoropolyoxyalkylene group represented by the formula:

$$-(Q)_p-CF_2O-(CF_2CF_2O)_m-(CF_2O)_n-CF_2-(Q)_p-$$

(where, Q is an alkylene group having 1 to 10 carbon atoms or an oxyalkylene group having 2 to 10 carbon atoms, p is 0 or 1, and m and n are integers such that m/n is 0.2 to 5 and the molecular weight of the (per) fluoropolyoxyalkylene group is 500 to 10,000, and preferably 1,000 to 4,000) is preferred. In this formula, Q is preferably selected from among $-CH_2OCH_2-$ and $-CH_2-O-(CH_2CH_2O)_sCH_2-$ (s=1 to 3).

Preferred bis-olefins include:
$CH_2=CH-(CF_2)_4-CH=CH_2$,
$CH_2=CH-(CF_2)_6-CH=CH_2$, and
bis-olefins represented by the formula: $CH_2=CH-Z'-CH=CH_2$
(where, $Z^1$ is $-CH_2OCH_2-CF_2O-(CF_2CF_2O)_m-(CF_2O)_n-CF_2-CH_2OCH_2-$ (m/n=0.5)).

Of these, 3,3,4,4,5,5,6,6,7,7,8,8-dodecafluoro-1,9-decadiene, which is represented by $CH_2=CH-(CF_2)_6-CH=CH_2$, is preferred.

The amount of the structural unit derived from a monomer other than VdF and the second monomer included in the fluororubber (A) is preferably 0 to 40 mol %, more preferably 0 to 30 mol %, still more preferably 0 to 20 mol %, and particularly preferably 0 to 10 mol %, based on 100 mol % of the total structural units.

Thus, the fluororubber (A) may comprise a structural unit derived from a monomer other than VdF and the second monomer. However, in order to effectively enhance the tensile properties at high temperatures of the crosslinked fluororubber article obtained from the fluororubber composition of the present invention, the fluororubber (A) preferably comprises no structural unit derived from a monomer other than VdF and the second monomer. That is, it is one of the preferable embodiments of the present invention that the fluororubber (A) is a binary copolymer consisting only of the VdF unit and the second monomer unit.

Further, the fluororubber (A) is more preferably at least one binary copolymer selected from the group consisting of VdF/HFP copolymers, VdF/2,3,3,3-tetrafluoropropylene copolymers and VdF/PAVE copolymers, and particularly preferably at least one binary copolymer selected from the group consisting of VdF/HFP copolymers and VdF/2,3,3,3-tetrafluoropropylene copolymers.

The number average molecular weight (Mn) of the fluororubber (A) is preferably 5,000 to 500,000, more preferably 10,000 to 500,000, and particularly preferably 20,000 to 500,000.

The above-mentioned fluororubber (A) can be produced using a common method such as emulsion polymerization, suspension polymerization or solution polymerization. In particular, by using a polymerization method that uses an iodine (or bromine) compound, which is known as iodine (or bromine) transfer polymerization, it is possible to produce a fluororubber having a narrow molecular weight distribution.

In addition, in cases where, for example, it is necessary for the fluororubber composition to have a low viscosity, the above-mentioned fluororubber (A) may be blended with another fluororubber. Examples of other fluororubbers include low molecular weight liquid fluororubbers (number average molecular weight: 1,000 or higher), low molecular weight fluororubbers having number average molecular weights of approximately 10,000 and fluororubbers having number average molecular weights of approximately 100,000 to 200,000.

From the perspective of processability, the Mooney viscosity at 100° C. of the fluororubber (A) is 20 to 200, and preferably 30 to 180. The Mooney viscosity is measured in accordance with JIS K6300.

(B) Carbon Black

The fluororubber composition of the present invention comprises a carbon black (B). Examples of types of a carbon black (B) include furnace black, acetylene black, thermal black, channel black and graphite, and specific examples thereof include SAF-HS ($N_2SA$: 142 $m^2/g$, DBP: 130 ml/100 g), SAF ($N_2SA$: 142 $m^2/g$, DBP: 115 ml/100 g), N234 ($N_2SA$: 126 $m^2/g$, DBP: 125 ml/100 g), ISAF ($N_2SA$: 119 $m^2/g$, DBP: 114 ml/100 g), ISAF-LS ($N_2SA$: 106 $m^2/g$, DBP: 75 ml/100 g), ISAF-HS ($N_2SA$: 99 $m^2/g$, DBP: 129 ml/100 g), N339 ($N_2SA$: 93 $m^2/g$, DBP: 119 ml/100 g), HAF-LS ($N_2SA$: 84 $m^2/g$, DBP: 75 ml/100 g), HAS-HS ($N_2SA$: 82 $m^2/g$, DBP: 126 ml/100 g), HAF ($N_2SA$: 79 $m^2/g$, DBP: 101 ml/100 g) N351 ($N_2SA$: 74 $m^2/g$, DBP: 127 ml/100 g), LI-HAF ($N_2SA$: 74 $m^2/g$, DBP: 101 ml/100 g). MAF-HS ($N_2SA$: 56 $m^2/g$, DBP: 158 ml/100 g), MAF ($N_2SA$: 49 $m^2/g$, DBP: 133 ml/100 g), FEF-HS ($N_2SA$: 42 $m^2/g$, DBP: 160 ml/100 g). FEF ($N_2SA$: 42 $m^2/g$, DBP: 115 ml/100 g), SRF-HS ($N_2SA$: 32 $m^2/g$, DBP: 140 ml/100 g), SRF-HS ($N_2SA$: 29 $m^2/g$, DBP: 152 ml/100 g). GPF ($N_2SA$: 27 $m^2/g$, DBP: 87 ml/100 g), SRF ($N_2SA$: 27 $m^2/g$, DBP: 68 ml/100 g), SRF-LS ($N_2SA$: 23 $m^2/g$, DBP: 51 ml/100 g), FT ($N_2SA$: 19 $m^2/g$, DBP: 42 ml/100 g), and MT ($N_2SA$: 8 $m^2/g$, DBP: 43 ml/100 g). These types of a carbon black can be used in isolation or as a combination of two or more types thereof. Among these, SAF-HS, SAF, N234, ISAF, ISAF-LS, ISAF-HS, N339, HAF-LS, HAS-HS, HAF, N351, LI-HAF, and MAF-HS are preferable.

Of these, it is preferable for the carbon black to have a nitrogen adsorption specific surface area ($N_2SA$) of 25 to 180 $m^2/g$ and a dibutyl phthalate (DBP) absorption of 40 to 180 ml/100 g. Moreover, when a carbon black having high $N_2SA$ and DBP values is used, the values for loss elastic modulus (E") and storage elastic modulus (E') of the crosslinked fluororubber article to be obtained mentioned below increase.

If the nitrogen adsorption specific surface area ($N_2SA$) is lower than 25 $m^2/g$, the mechanical properties tend to deteriorate when the carbon black is blended with a rubber, and for this reason, the nitrogen adsorption specific surface area ($N_2SA$) is preferably not lower than 50 $m^2/g$, more preferably not lower than 70 $m^2/g$, still more preferably not lower than 90 $m^2/g$, and particularly preferably not lower than 110 $m^2/g$. The upper limit is preferably 180 $m^2/g$ from the perspective of general ease of procurement.

If the dibutyl phthalate (DBP) absorption is lower than 40 ml/100 g, the mechanical properties tend to deteriorate when the carbon black is blended with a rubber, and for this reason, the dibutyl phthalate (DBP) absorption is not lower than 50 ml/100 g, preferably not lower than 60 ml/100 g, and particularly preferably not lower than 80 ml/100 g. From the perspective of general ease of procurement, the upper limit is preferably 175 ml/100 g, and especially 170 ml/100 g.

It is preferable to blend 5 to 65 parts by mass of the carbon black (B) relative to 100 parts by mass of the fluororubber (A). If the blending quantity of the carbon black (B) is too high or too low, the mechanical properties of the crosslinked article tend to deteriorate. From the perspective of obtaining a good balance of physical properties, the blending quantity of the carbon black is preferably not lower than 6 parts by mass, and more preferably not lower than 10 parts by mass, relative to 100 parts by mass of the fluororubber (A), and is preferably not higher than 55 parts by mass, more preferably not higher than 50 parts by mass, even more preferably not higher than 49 parts by mass, and particularly preferably not higher than 45 parts by mass, relative to 100 parts by mass of the fluororubber (A) from the perspective of obtaining a good balance of physical properties.

The fluororubber composition of the present invention may comprise other components as long as the fluororubber (A) and the carbon black (B) are comprised.

Crosslinking Agent (C) and Crosslinking Accelerator (D)

The crosslinking agent (C) and the crosslinking accelerator (D) can be selected as appropriate according to the crosslinking system, the type of fluororubber (A) being crosslinked (for example, the copolymer composition, the presence/absence and type of crosslinkable groups), the specific intended use or mode of use of the obtained crosslinked article, mixing conditions and the like.

The crosslinking system can be, for example, a peroxide crosslinking system, a polyol crosslinking system, a polyamine crosslinking system, an oxazole crosslinking system, a thiazole crosslinking system, an imidazole crosslinking system, a triazine crosslinking system and the like.

(Peroxide Crosslinking System)

When crosslinking by means of a peroxide crosslinking system, because a carbon-carbon bond is present at a crosslinking site, chemical resistance and steam resistance are superior to a polyol crosslinking system, in which a carbon-oxygen bond is present at a crosslinking site, or a polyamine crosslinking system, in which a carbon-nitrogen double bond is present.

A crosslinking agent for a peroxide crosslinking system should be a peroxide capable of readily generating peroxy radicals in the presence of heat or an oxidation-reduction system, and specific examples thereof include organic peroxides such as 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy) hexyne-3, benzoyl peroxide, t-butylperoxybenzene, t-butylperoxybenzoate, t-butylperoxymaleic acid and t-butylperoxyisopropyl carbonate. Of these, 2,5-dimethyl-2,5-di(t-butylperoxy)hexane and 2,5-dimethyl-2,5-di(t-butylperoxy)hexyne-3 are preferred.

In addition, it is generally preferable to incorporate a crosslinking accelerator in a peroxide crosslinking system. Examples of crosslinking accelerators for peroxide-based crosslinking agents, and especially organic peroxide-based crosslinking agents, include triallyl cyanurate, triallyl isocyanurate (TRIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, N,N-diallylacrylamide, 1,6-divinyldodecafluorohexane, hexaallylphosphoramide, N,N,N',N'-tetraallylphthalamide, N,N,N',N'-tetraallylmaronamide, trivinylisocyanurate, 2,4,6-trivinylmethyltrisiloxane, tri(5-norbornene-2-methylene)cyanurate and triallylphosphite. Of these, triallyl isocyanurate (TRIC) is preferred from the perspectives of crosslinking properties and the physical properties of a crosslinked article.

It is possible to use a crosslinking accelerator having low self polymerization properties as a crosslinking accelerator used in a peroxide crosslinking system. A crosslinking accelerator having low self polymerization properties means a compound having low self polymerization properties, unlike triallyl isocyanurate (TRIC), which is well-known as a crosslinking accelerator.

Examples of crosslinking accelerators having low self polymerization properties include:
trimethallyl isocyanurate (TMAIC), which is represented by

[Formula 4]

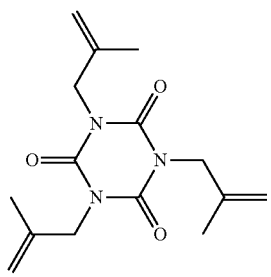

p-quinonedioxime, which is represented by

[Formula 5]

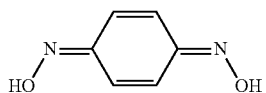

p,p'-dibenzoylquinonedioxime, which is represented by

[Formula 6]

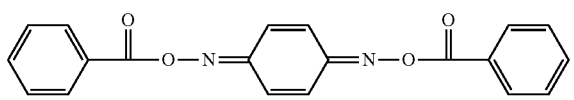

maleimide, which is represented by

[Formula 7]

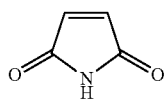

N-phenylene maleimide, which is represented by

[Formula 8]

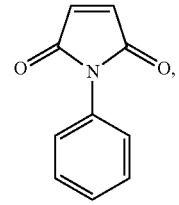

and
N,N'-phenylene bismaleimide, which is represented by

[Formula 9]

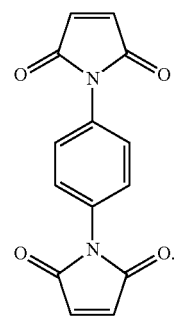

A preferred crosslinking accelerator having low self polymerization properties is trimethallyl isocyanurate (TMAIC).

It is possible to use a bis-olefin as a crosslinking accelerator used in a peroxide crosslinking system.

Examples of bis-olefins able to be used as crosslinking accelerators include bis-olefins represented by the formula:

$R^2R^3C=CR^4-Z-CR^5=CR^6R^7$ (where, $R^2$, $R^3$, $R^4$, $R^5$, $R^6$ and $R^7$ may be the same or different, and each denotes H or an alkyl group having 1 to 5 carbon atoms, and Z denotes a linear (straight chain) or branched-chain alkylene or cycloalkylene group having 1 to 18 carbon atoms, which may contain an oxygen atom and which is preferably at least partially fluorinated, or a (per)) fluoropolyoxyalkylene group).

Z is preferably a perfluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per)) fluoropolyoxyalkylene group represented by the formula:

$-(Q)_p-CF_2O-(CF_2CF_2O)_m-(CF_2O)_n-CF_2-(Q)_p-$ (where, Q is an alkylene or oxyalkylene group having 1 to 10 carbon atoms, p is 0 or 1, and m and n are integers such that m/n is 0.2 to 5 and the molecular weight of the (per)fluoropolyoxyalkylene group is 500 to 10,000, and preferably 1,000 to 4,000) is preferred. In this formula, Q is preferably selected from among $-CH_2OCH_2-$ and $-CH_2-O-(CH_2CH_2O)_sCH_2-$ (s=1 to 3).

Preferred bis-olefins include:
$CH_2=CH-(CF_2)_4-CH=CH_2$,
$CH_2=CH-(CF_2)_6-CH=CH_2$, and
bis-olefins represented by the formula: $CH_2=CH-Z'-CH=CH_2$ (where, $Z^1$ is $-CH_2OCH_2-CF_2O-(CF_2CF_2O)_m-(CF_2O)_n-CF_2-CH_2OCH_2-$ (m/n=0.5)).

Of these, 3,3,4,4,5,5,6,6,7,7,8,8-dodecafluoro-1,9-decadiene, which is represented by $CH_2=CH—(CF_2)_6—CH=CH_2$, is preferred.

In addition, from the perspective of crosslinking properties, a fluororubber that contains iodine atoms and/or bromine atoms as crosslinking sites is preferred as a fluororubber (A) that is suitable for a peroxide crosslinking system. From the perspective of obtaining a good balance of physical properties, the content of iodine atoms and/or bromine atoms is preferably 0.001 to 10 mass o, more preferably 0.01 to 5 mass %, and particularly preferably 0.1 to 3 mass %.

The blending quantity of a peroxide-based crosslinking agent is preferably 0.01 to 10 parts by mass, more preferably 0.1 to 9 parts by mass, and particularly preferably 0.2 to 8 parts by mass, relative to 100 parts by mass of the fluororubber (A). If the blending quantity of the peroxide-based crosslinking agent is lower than 0.01 parts by mass, crosslinking of the fluororubber (A) tends not to progress sufficiently, and if the blending quantity of the peroxide-based crosslinking agent exceeds 10 parts by mass, the balance between physical properties tends to deteriorate.

In addition, the blending quantity of the crosslinking accelerator is generally 0.01 to 10 parts by mass, and preferably 0.1 to 9 parts by mass, relative to 100 parts by mass of the fluororubber (A). If the blending quantity of the crosslinking accelerator is lower than 0.01 parts by mass, there is a tendency for undercuring to occur, and if the blending quantity of the crosslinking accelerator exceeds 10 parts by mass, the balance between physical properties tends to deteriorate.

(Polyol Crosslinking System)

Crosslinking by means of a polyol crosslinking system is preferable due to carbon-oxygen bonds being present at crosslinking sites, the permanent compression set being low and moldability being excellent.

Compounds known in the past as crosslinking agents for fluororubbers can be used as polyol crosslinking agents, and it is preferable to use, for example, a polyhydroxy compound, and especially an aromatic polyhydroxy compound from the perspective of achieving excellent heat resistance.

The above-mentioned aromatic polyhydroxy compound is not particularly limited, and can be, for example, 2,2-bis(4-hydroxyphenyl)propane (hereinafter referred to as "bisphenol A"), 2,2-bis(4-hydroxyphenyl)perfluoropropane (hereinafter referred to as "bisphenol AF"), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as "bisphenol B"), 4,4-bis(4-hydroxyphenyl) valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3'5,5'-tetrachlorobisphenol A and 3,3'5,5'-tetrabromobisphenol A. These aromatic polyhydroxy compounds may be in the form of alkali metal salts, alkaline earth metal salts and the like, but in cases where an acid is used to coagulate a copolymer, it is preferable not to use the above-mentioned metal salts.

Of these, polyhydroxy compounds are preferred from the perspective of the obtained crosslinked fluororubber article exhibiting a low permanent compression set and excellent moldability, and aromatic polyhydroxy compounds are more preferred from the perspective of achieving excellent heat resistance, with bisphenol AF being particularly preferred.

In addition, it is generally preferable to incorporate a crosslinking accelerator in a polyol crosslinking system. By using a crosslinking accelerator, it is possible to facilitate a crosslinking reaction due to an intramolecular double bond being generated in a reaction in which hydrofluoric acid is eliminated from the main chain of the fluororubber and addition of the polyhydroxy compound to the generated double bond being facilitated.

Onium compounds are commonly used as crosslinking accelerators for polyol crosslinking systems. The onium compound is not particularly limited, and can be, for example, an ammonium compound such as a quaternary ammonium salt, a phosphonium compound such as a quaternary phosphonium salt, an oxonium compound, a sulfonium compound, a cyclic amine or a monofunctional amine compounds. Of these, quaternary ammonium salts and quaternary phosphonium salts are preferred.

The quaternary ammonium salt is not particularly limited, and can be, for example,
8-methyl-1,8-diazabicyclo[5.4.0]-7-undecenium chloride,
8-methyl-1,8-diazabicyclo[5.4.0]-7-undecenium iodide,
8-methyl-1,8-diazabicyclo[5.4.0]-7-undecenium hydroxide,
8-methyl-1,8-diazabicyclo[5.4.0]-7-undecenium methyl sulfate,
8-ethyl-1,8-diazabicyclo[5.4.0]-7-undecenium bromide,
8-propyl-1,8-diazabicyclo[5.4.0]-7-undecenium bromide,
8-dodecyl-1,8-diazabicyclo[5.4.0]-7-undecenium chloride,
8-dodecyl-1,8-diazabicyclo[5.4.0]-7-undecenium hydroxide,
8-eicosyl-1,8-diazabicyclo[5.4.0]-7-undecenium chloride,
8-tetracosyl-1,8-diazabicyclo[5.4.0]-7-undecenium chloride,
8-benzyl-1,8-diazabicyclo[5.4.0]-7-undecenium chloride (hereinafter referred to as "DBU-B"),
8-benzyl-1,8-diazabicyclo[5.4.0]-7-undecenium hydroxide,
8-phenethyl-1,8-diazabicyclo[5.4.0]-7-undecenium chloride and 8-(3-phenylpropyl)-1,8-diazabicyclo[5.4.0]-7-undecenium chloride. Of these, DBU-B is preferred from the perspectives of crosslinking properties and the physical properties of a crosslinked article.

In addition, the quaternary phosphonium salt is not particularly limited, and can be, for example, tetrabutyl phosphonium chloride, benzyl triphenyl phosphonium chloride (hereinafter referred to as "BTPPC"), benzyl trimethyl phosphonium chloride, benzyl tributyl phosphonium chloride, tributyl allyl phosphonium chloride, tributyl-2-methoxypropyl phosphonium chloride or benzyl phenyl (dimethyl amino) phosphonium chloride. Of these, benzyl triphenyl phosphonium chloride (BTPPC) is preferred from the perspectives of crosslinking properties and the physical properties of a crosslinked article.

In addition, it is possible to use a molten salt of bisphenol AF and a quaternary ammonium salt or quaternary phosphonium salt or the chlorine-free crosslinking accelerator disclosed in Japanese Patent Application Publication No. H11-147891 as a crosslinking accelerator.

The blending quantity of the polyol crosslinking agent is preferably 0.01 to 10 parts by mass, and more preferably 0.1 to 7 parts by mass, relative to 100 parts by mass of the fluororubber (A). If the blending quantity of the polyol crosslinking agent is lower than 0.01 parts by mass, crosslinking of the fluororubber (A) tends not to progress sufficiently, and if the blending quantity of the polyol crosslinking agent exceeds 10 parts by mass, the balance between physical properties tends to deteriorate.

In addition, the blending quantity of the crosslinking accelerator is preferably 0.01 to 8 parts by mass, and more preferably 0.02 to 5 parts by mass, relative to 100 parts by mass of the fluororubber (A). If the blending quantity of the crosslinking accelerator is lower than 0.01 parts by mass, crosslinking of the fluororubber (A) tends not to progress sufficiently, and if the blending quantity of the peroxide-based crosslinking agent exceeds 8 parts by mass, the balance between physical properties tends to deteriorate.

(Polyamine Crosslinking System)

Crosslinking by means of polyamine crosslinking is characterized by a carbon-nitrogen double bond being present at a crosslinking site and excellent dynamic mechanical characteristics being achieved. However, there is a tendency for the permanent compression set to be higher than in cases in which crosslinking is effected by means of a polyol crosslinking system or a peroxide crosslinking system.

Examples of polyamine-based crosslinking agents include polyamine compounds such as hexamethylenediamine carbamate, N,N'-dicinnamylidene-1,6-hexamethylenediamine and 4,4'-bis(aminocyclohexyl)methane carbamate. Of these, N,N'-dicinnamylidene-1,6-hexamethylenediamine is preferred.

The blending quantity of the polyamine-based crosslinking agent is preferably 0.01 to 10 parts by mass, and more preferably 0.2 to 7 parts by mass, relative to 100 parts by mass of the fluororubber (A). If the blending quantity of the polyamine-based crosslinking agent is lower than 0.01 parts by mass, crosslinking of the fluororubber (A) tends not to progress sufficiently, and if the blending quantity of the polyol crosslinking agent exceeds 10 parts by mass, the balance between physical properties tends to deteriorate.

In the present invention, a peroxide crosslinking system or polyol crosslinking system is preferred as the crosslinking system, and it is preferable to use a crosslinking agent (C) that is appropriate for the crosslinking system used. Of these, it is more preferable to use a crosslinking agent for a peroxide crosslinking system.

Common rubber components such as fillers, processing aids, plasticizers, colorants, tackifiers, adhesive aids, acid acceptors, pigments, flame retardants, lubricants, photostabilizers, weathering stabilizers, anti-static agents, ultraviolet radiation absorbers, antioxidants, mold release agents, foaming agents, perfumes, oils, softening agents and other polymers such as polyethylene, polypropylene, polyamides, polyesters and polyurethanes can, if necessary, be blended in the fluororubber composition of the present invention at quantities that do not impair the effect of the present invention.

Examples of fillers include metal oxides such as calcium oxide, titanium oxide, aluminum oxide and magnesium oxide; metal hydroxides such as magnesium hydroxide aluminum hydroxide and calcium hydroxide; carbonates such as magnesium carbonate, aluminum carbonate, calcium carbonate and barium carbonate; silicates such as magnesium silicate, calcium silicate, sodium silicate and aluminum silicate; sulfates such as aluminum sulfate, calcium sulfate and barium sulfate; synthetic hydrotalcite; metal sulfides such as molybdenum disulfide, iron sulfide and copper sulfide; diatomaceous earth, asbestos, lithopone (zinc sulfide/barium sulfide), graphite, fluorocarbons, calcium fluoride, coke, fine quartz powder, talc, powdered mica, wollastonite, carbon fibers, aramid fibers, whiskers, glass fibers, organic reinforcing agents, organic fillers, polytetrafluoroethylene, mica, silica, celite and clay. In addition, acid acceptors include calcium oxide, magnesium oxide, lead oxide, zinc oxide, magnesium hydroxide, calcium hydroxide, aluminum hydroxide and hydrotalcite. These may be used in isolation or as a combination of two or more types thereof as appropriate. These may be added at any step in the below-mentioned mixing method, but are preferably added when mixing the fluororubber (A) and the carbon black (B) using an internal mixer or roll mixer.

Processing aids include higher fatty acids such as stearic acid, oleic acid, palmitic acid and lauric acid; higher fatty acid salts such as sodium stearate and zinc stearate; higher fatty acid amides such as stearic acid amide and oleic acid amide; higher fatty acid esters such as ethyl oleate; petroleum-based waxes such as carnauba wax and ceresin wax; polyglycols such as ethylene glycol, glycerin and diethylene glycol; aliphatic hydrocarbons such as Vaseline and paraffin; silicone-based oils, silicone-based polymers, low molecular weight polyethylene, phthalic acid esters, phosphoric acid esters, rosin, (halogenated) dialkylamines, surfactants, sulfone compounds, fluorine-based additives and organic amine compounds.

Of these, organic amine compounds and acid acceptors are preferred blending components from the perspective of improving the reinforcing properties by being present when the fluororubber (A) and the carbon black (B) are mixed using an internal mixer or a roll mixer.

Preferred examples of organic amine compounds include primary amines represented by $R^1NH_2$, secondary amines represented by $R^1R^2NH$, and tertiary amines represented by $R^1R^2R^3N$. $R^1$, $R^2$ and $R^3$ may be the same or different, and are each preferably an alkyl group having 1 to 50 carbon atoms, and the alkyl groups may contain a benzene ring as a functional group and may contain a double bond or a conjugated double bond. Moreover, the alkyl groups may be straight chain or branched chain alkyl groups.

Examples of primary amines include coconut amine, octylamine, lauryl amine, stearyl amine, oleyl amine, tallow amine, 17-phenyl-heptadecylamine, octadeca-7,11-dienylamine, octadeca-7,9-dienylamine, octadec-9-enylamine and 7-methyl-octadec-7-enylamine, examples of secondary amines include distearyl amine, and examples of tertiary amines include dimethyloctylamine, dimethyldecylamine, dimethyllaurylamine, dimethylmyristylamine, dimethylpalmitylamine, dimethylstearylamine and dimethylbehenylamine. Of these, amines, and particularly primary amines, having approximately 20 carbon atoms are preferred from the perspectives of ease of procurement and increased reinforcing properties.

It is preferable to blend 0.01 to 5 parts by mass of the organic amine compound relative to 100 parts by mass of the fluororubber (A). If the blending quantity of the organic amine compound is too high, mixing tends to become difficult, and if the blending quantity of the organic amine compound is too low, the reinforcing properties tend to deteriorate. A more preferred blending quantity is not lower than 0.1 parts by mass relative to 100 parts by mass of the fluororubber (A) from the perspective of reinforcing properties and not higher than 4 parts by mass from the perspectives of reinforcing properties and ease of mixing.

Of the acid acceptors mentioned above, metal hydroxides such as calcium hydroxide; metal oxides such as magnesium oxide and zinc oxide; and hydrotalcite are preferred from the perspective of reinforcing properties, with zinc oxide being particularly preferred.

It is preferable to blend 0.01 to 10 parts by mass of the acid acceptor relative to 100 parts by mass of the fluororubber (A). If the blending quantity of the acid acceptor is too high, the physical properties tend to deteriorate, and if the blending quantity of the acid acceptor is too low, the reinforcing properties tend to deteriorate. A more preferred blending quantity is not lower than 0.1 parts by mass relative to 100 parts by mass of the fluororubber (A) from the perspective of reinforcing properties and not higher than 8 parts by mass, and especially not higher than 5 parts by mass, from the perspectives of physical properties and ease of mixing.

The fluororubber composition of the present invention preferably has a difference δG' (G' (1%)-G' (100%)) of not lower than 120 kPa and not higher than 3,000 kPa, where G' (1%) denotes a modulus of shearing elasticity at a dynamic strain of 1%, G' (100%) denotes a modulus of shearing elasticity at a dynamic strain of 100%, and G' (1%) and G' (100%) are determined by a dynamic viscoelasticity test carried out on an unvulcanised rubber with a rubber process analyzer (RPA) in a condition that the measurement temperature is 100° C. and the measurement frequency is 1 Hz.

Difference δG' is used as a parameter evaluating the reinforcing properties of a rubber composition, and is measured and calculated in a dynamic viscoelasticity test using a rubber process analyzer.

A fluororubber composition having a difference δG' value of not lower than 120 kPa and not higher than 3,000 kPa is advantageous in terms of a normal state at room temperature, tensile properties at high temperatures and the like.

The difference δG' is preferably not lower than 150 kPa, more preferably not lower than 160 kPa, still more preferably not lower than 300 kPa, particularly preferably not lower than 300 kPa, and more particularly preferably not lower than 500 kPa from the perspective of achieving a good normal state at room temperature, tensile properties at high temperatures and the like. Difference δG' is preferably not higher than 2,800 kPa, and more preferably not higher than 2,500 kPa, from the perspective of achieving a good normal state at room temperature, hardness, viscosity when extruded, tensile properties at high temperatures and the like.

The fluororubber composition of the present invention can be produced using, for example an internal mixer or a roll mixer.

Specifically, in order to give a fluororubber composition which can provide a crosslinked article having further excellent tensile properties at high temperatures, it is preferably produced by the following production method (1).

The production method (1) includes a step (1-1) of mixing the fluororubber (A) and the carbon black (B) with an internal mixer or a roll mixer until the maximum temperature reaches 80 to 220° C. so as to obtain an intermediate composition; a step (1-2) of cooling the intermediate composition to a temperature of lower than 50° C.; and a step (2-1) of mixing the cooled intermediate composition until the maximum temperature reaches not lower than 10° C. but lower than 80° C. so as to obtain a fluororubber composition.

Step (1-1) is a step of mixing the fluororubber (A) and the carbon black (B) until the maximum temperature reaches 80 to 220° C. so as to obtain an intermediate composition.

Step (1-1) is characterized by mixing the fluororubber (A) and the carbon black (B) at a high temperature. By including step (1-1), it is possible to produce a fluororubber composition that can give a crosslinked fluororubber article having excellent tensile properties at high temperatures.

The mixing in step (1-1) is carried out using an internal mixer or a roll mixer. The mixing in step (1-1) is preferably carried out using an internal mixer because it enables mixing at high temperatures. Examples of internal mixers include tangential internal mixers such as Banbury mixers, meshing type internal mixers such as intermixers, pressurizing kneaders, single screw mixers and twin screw mixers.

When using an internal mixer, the average shear rate of the rotor is preferably 20 to 1000 (1/sec), more preferably 50 to 1000 (1/sec), yet more preferably 100 to 1000 (1/sec), further preferably 200 to 1000 (1/sec), and particularly preferably 300 to 1000 (1/sec).

The average shear rate (1/sec) is calculated using the following expression.

Average shear rate(1/sec)=(π×D×R)/(60(sec)×c)

(in the expression,
D is the diameter of the rotor or the diameter of the roll (cm)
R is the rate of rotation (rpm)
c is the tip clearance (cm. This is the size of the gap between the rotor and the casing or between the rolls)

It is possible to further mix the crosslinking agent (C) and/or the crosslinking accelerator (D) in step (1-1). Incases where the crosslinking agent is a polyol-based crosslinking agent in particular, it is preferable to further mix the crosslinking agent (C) and/or the crosslinking accelerator (D) in step (1-1). It is possible to place the fluororubber (A) and the carbon black (B), and the crosslinking agent (C) and/or crosslinking accelerator (D) simultaneously in an internal mixer and then carry out mixing; it is also possible to mix the fluororubber, and the crosslinking agent (C) and/or crosslinking accelerator (D) and then mix the carbon black (B).

In addition, it is preferable to further mix an organic amine compound and/or an acid acceptor in step (1-1).

The mixing in step (1-1) is carried out until the maximum temperature of the mixed materials reaches 80 to 220° C. The above-mentioned mixing is preferably carried out until the maximum temperature reaches 120° C. or higher, and more preferably until the maximum temperature reaches 200° C. or lower. The above-mentioned maximum temperature can be determined by measuring the temperature of the mixed materials immediately after being discharged from the mixer.

In the production method (1), step (1-2) is a step in which the intermediate composition obtained in step (1-1) is cooled to a temperature of lower than 50° C. The intermediate composition obtained in step (1-1) has a temperature of 80 to 220° C., but by carrying out step (2-1) after a sufficiently cooling the intermediate composition, it is possible to produce a fluororubber composition that gives a crosslinked fluororubber article having excellent tensile properties at high temperatures. In step (1-2), it is preferable for the cooling to be carried out so that the entire intermediate composition reaches a temperature within the above-mentioned range. The lower limit of the cooling temperature is not particularly limited, but may be 10° C.

In step (1-2), it is also preferable to carry out the cooling while mixing the intermediate composition using a roll mixer.

Step (1-1) and step (1-2) may be repeated any number of times. If step (1-1) and step (1-2) are carried out repeatedly, it is preferable for the intermediate composition to be mixed until the maximum temperature reaches 120 to 220° C., and more preferably mixed until the maximum temperature reaches 120 to 140° C., in step (1-1) and step (1-2). If step (1-1) and step (1-2) are carried out repeatedly, the mixing may be carried out using an internal mixer or a roll mixer. An internal mixer is more preferably used.

When using a roll mixer, the average shear rate of the rotor is preferably 20 (1/sec) or higher, more preferably 50 (1/sec) or higher, yet more preferably 100 (1/sec) or higher, further preferably 200 (1/sec) or higher, particularly preferably 300 (1/sec) or higher, and preferably 1000 (1/sec) or lower.

The production method (1) preferably includes a step of supplying the fluororubber (A) and the carbon black (B) in an internal mixer or a roll mixer, preferably an internal mixer. During the step, the crosslinking agent (C) and/or crosslinking accelerator (D) may be supplied, and an organic amine compound and/or an acid acceptor may be supplied.

Step (1-1) may include a step in which arbitrary additives are introduced up to the point at which the intermediate composition is discharged. One or more of these additives may be used. These additives may be introduced one or more times. In cases where two or more types of additive are introduced, the additives may be introduced simultaneously or separately. In addition, a single additive may be introduced a plurality of times. The "step in which arbitrary additives are introduced up to the point at which the intermediate composition is discharged" can be, for example, a step in which a carbon black (B') that is different from the carbon black (B) initially introduced in step (1-1) is introduced up to the point at which the intermediate composition is discharged.

In cases where step (1-1) and step (1-2) are repeated also, each of steps (1-1) may include the above-mentioned "step in which arbitrary additives are introduced up to the point at which the intermediate composition is discharged". For example, in a second step (1-1), it is possible to further introduce a carbon black (B') that is different from the carbon black (B) used in the first step (1-1).

In the production method (1), step (2-1) is a step in which a fluororubber composition is obtained by mixing the cooled intermediate composition obtained in step (1-2).

Step (2-1) is a step in which the sufficiently cooled intermediate composition obtained in step (1-2) is further mixed, and is an important step in order to improve the high-temperature tensile properties of a crosslinked fluororubber article.

It is preferable for the mixing in step (2-1) to be carried out until the maximum temperature of the composition reaches not lower than 10° C. but lower than 80° C. If the maximum temperature of the composition during the mixing becomes too high, there are concerns that it will not be possible to obtain a fluororubber composition able to give a crosslinked fluororubber article having excellent tensile properties at high temperatures.

Step (2-1) may include a step in which different cooled intermediate compositions obtained in step (1-2) are mixed together. In such cases, the mixing should be carried out until the maximum temperature of the mixture of different intermediate compositions reaches not lower than 10° C. but lower than 80° C.

The production method (1) preferably further includes, after step (2-1), a step (2-2) in which step (2-1) is repeated m−1 times (m is an integer of 2 or higher). By carrying out step (2-1) a total of two or more times, it is possible to stably produce a fluororubber composition that can produce a crosslinked fluororubber article having excellent tensile properties at high temperatures. The above-mentioned m is preferably an integer of 5 or higher, more preferably an integer of 10 or higher, further preferably an integer of 30 or higher, and particularly preferably an integer of 50 or higher. In each of steps (2-2), it is also preferable to include a step in which the intermediate composition is cooled before mixing.

The mixing in step (2-1) and step (2-2) can be carried out using the above-mentioned internal mixer or roll mixer.

It is preferable for step (2-1) and step (2-2) to be steps in which the intermediate composition is mixed by being introduced into a roll mixer and then tight milled.

FIG. 1 is a schematic view showing a method for mixing by tight milling. As shown in FIG. 1(a), the intermediate composition is introduced into an open roll mixer 10 provided with a first roll 11 and a second roll 12. The first roll 11 and the second roll 12 rotate at different speeds in the directions indicated by the arrows. The introduced intermediate composition is rolled into a sheet by being passed between the first roll 11 and the second roll 12 while being subjected to a shearing force, as shown in FIG. 1(b), after which the rolled composition is wound at an arbitrary location, as shown in FIG. 1(c).

From the perspective of obtaining a fluororubber composition able to give a crosslinked fluororubber article having excellent tensile properties at high temperatures, it is preferable for step (2-1) and step (2-2) to be carried out so that the ratio (P/Q), which is obtained by dividing the values (P) of G' (1%)/G' (100%) of the fluororubber composition obtained in step (2-1) and the fluororubber composition obtained in step (2-2) by the value (Q) of G' (1%)/G' (100%) of the intermediate composition obtained in step (1-2) to both be 0.3 to 1.5, more preferably 1.3 or lower, even more preferably 1.0 or lower, particularly preferably lower than 1.0, and especially 0.9 or lower.

The modulus of shearing elasticity at a dynamic strain of 1% (G' (1%)) and the ratio (G' (1%)/G' (100%)) of the modulus of shearing elasticity (G' (1%)) to the modulus of shearing elasticity at a dynamic strain of 100% (G' (100%)) can be calculated from the dynamic viscoelasticity, which is measured using a rubber process analyzer (RPA 2000, manufactured by Alpha Technologies) under conditions of 100° C. and 1 Hz after preheating for 1 minute at 100° C.

It is possible to improve the tensile properties of a crosslinked article at high temperatures even by tight milling just once, but in order to achieve superior tensile properties at high temperatures, it is preferable to carry out the above-mentioned type milling a total of m times (m is an integer of 2 or higher). The above-mentioned m is preferably an integer of 5 or higher, more preferably an integer of 10 or higher, further preferably an integer of 30 or higher, and particularly preferably an integer of 50 or higher.

It is preferable for the above-mentioned production method to further include a step of mixing the crosslinking agent (C) and/or the crosslinking accelerator (D) with the fluororubber composition obtained in step (2-1) or step (2-2). As mentioned above, it is possible to further mix the crosslinking agent (C) and/or the crosslinking accelerator (D) in step (1-1). In cases where the crosslinking system is a peroxide crosslinking system, it is preferable to mix the crosslinking agent (C) and/or the crosslinking accelerator (D) with the fluororubber composition obtained in step (2-1) or step (2-2) without mixing the crosslinking agent (C) and the crosslinking accelerator (D) in step (1-1).

It is possible to simultaneously mix the crosslinking agent (C) and the crosslinking accelerator (D), but it is also possible to first mix the crosslinking accelerator (D) and then mix the crosslinking agent (C). When mixing is carried out in step (1-1), the mixing conditions for the crosslinking agent (C) and the crosslinking accelerator (D) are the same as the conditions in the above-mentioned step (1-1), except that the maximum temperature during the mixing is not higher than 130° C. Of these, it is preferable to carry out the mixing using an open roll mixer, internal mixer and the like, whereby the average rate of rotation of the rotor is not lower than 20 (1/sec), preferably not lower than 50 (1/sec), more preferably not lower than 100 (1/sec), even more preferably not lower than 200 (1/sec), and particularly preferably not lower than 300 (1/sec). In cases where the crosslinking agent (C) and/or the crosslinking accelerator (D) are mixed with the fluororubber composition obtained in step (2-1) or step (2-2), it is preferable to carry out the mixing so that the maximum temperature is lower than 130° C.

In addition to the production method (1), the following production method (2) may also be employable, for example.

The production method (2) includes: supplying the fluororubber (A) and the carbon black (B), and optionally an organic amine compound and/or an acid acceptor in a predetermined amount to an internal mixer or a roll mixer; and mixing the contents under the conditions: an average shear rate of a rotor is not lower than 20 (1/sec), preferably not lower than 50 (1/sec), more preferably not lower than 100 (1/sec), even more preferably not lower than 200 (1/sec), and particularly preferably 300 (1/sec), and the maximum temperature Tm during the mixing is 80 to 220° C. (preferably 120 to 200° C.). The mixing in the production method (2) is preferably carried out using an internal mixer because it enables mixing at high temperatures.

The fluororubber composition obtained by the method (2) does not include the crosslinking agent (C), the crosslinking accelerator (D), and the like. Further, the mixing of the method (2) may be performed multiple times. When the mixing is performed multiple times, conditions at second and subsequent mixing may be the same as in the method (2) except that the maximum temperature Tm during the mixing is set at 140° C. or lower.

One of the preparation methods of the fluororubber composition of the present invention based on the production method (2) is, for example, a method of blending the crosslinking agent (C) and/or the crosslinking accelerator (D) to the fluororubber composition obtained by the method (2) or by repeating the method (2) multiple times, and mixing them.

The crosslinking agent (C) and the crosslinking accelerator (D) may be simultaneously blended and mixed, or firstly the crosslinking accelerator (D) may be blended and mixed, and then the crosslinking agent (C) may be blended and mixed. The mixing conditions of the crosslinking agent (C) and the crosslinking accelerator (D) may be the same as in the method (2) except that the maximum temperature Tm during the mixing is set at 130° C. or lower.

One of the preparation methods of the fluororubber composition of the present invention is, for example, a method including: supplying the fluororubber (A), the carbon black (B), the crosslinking agent (C) and/or the crosslinking accelerator (D) in a predetermined amount to a roll mixer in an appropriate sequence; and mixing the contents under the conditions: an average shear rate of a rotor is not lower than 20 (1/sec), preferably not lower than 50 (1/sec), more preferably not lower than 100 (1/sec), even more preferably not lower than 200 (1/sec), particularly preferably not lower than 300 (1/sec), and the maximum temperature Tm during the mixing is 130° C. or lower.

In the case of the polyol-based crosslinking agent, a uniform dispersion prepared by preliminary mixing the fluororubber (A), the crosslinking agent (C), and the crosslinking accelerator (D) may be used. For example, firstly, the fluororubber (A), the polyol-based crosslinking agent, and the crosslinking accelerator are mixed, and then the carbon black and the organic amine compound are blended and mixed at the maximum temperature Tm during the mixing of 80 to 220° C. Finally, an acid acceptor is blended and mixed at the maximum temperature Tm during the mixing of 130° C. or lower. The mixing is preferably performed at an average shear rate of a rotor of not lower than 20 (1/sec) (preferably not lower than 50 (1/sec), more preferably not lower than 100 (1/sec), even more preferably not lower than 200 (1/sec), and particularly preferably not lower than 300 (1/sec)).

By crosslinking the fluororubber composition of the present invention, it is possible to obtain a crosslinked fluororubber article.

The method for crosslinking the fluororubber composition should be selected as appropriate, but can be, for example, an ordinary crosslinking method such as a molding method such as extrusion or wrapped cure or a crosslinking method that uses a vulcanizing pan and the like. In addition, in cases where secondary crosslinking is required due to the intended use of the crosslinked article, the composition may be secondarily cured in an oven.

In addition, the crosslinked fluororubber article achieves particularly excellent resting physical properties and tensile properties at high temperatures when the loss elastic modulus (E") is not lower than 400 kPa and not higher than 6,000 kPa in a dynamic viscoelasticity test (measurement mode: tensile, chuck gap: 20 mm, tensile strain: 1%, measurement frequency: Hz, static tension under a constant static load condition for measuring strain distribution: 157 cN, measurement temperature: 160° C.)

The lower limit of the loss elastic modulus is preferably 420 kPa, and more preferably 430 kPa, and the upper limit of the loss elastic modulus is preferably 5,900 kPa, and more preferably 5,800 kPa.

In addition, from the perspective of improving tensile properties at high temperature, it is preferable for the crosslinked fluororubber article to exhibit a storage elastic modulus (E') of not lower than 1,500 kPa and not higher than 20,000 kPa in a dynamic viscoelasticity test (measurement mode: tensile, chuck gap: 20 mm, measurement temperature: 160° C., tensile strain: 1%, static tension under a constant static load condition for measuring strain distribution: 157 cN, measurement frequency: 10 Hz). The lower limit of the storage elastic modulus is preferably 1,600 kPa, and more preferably 1,800 kPa, and the upper limit of the storage elastic modulus is preferably 19,000 kPa, and more preferably 18,000 kPa.

In addition, in order to be suitable for use in high-temperature environments, it is preferable for the crosslinked fluororubber article to exhibit an elongation at break at 160° C. of 100 to 700%, more preferably not lower than 110% and even more preferably not lower than 120%, and more preferably not higher than 680% and even more preferably not higher than 650%.

In addition, in order to be suitable for use in high-temperature environments, it is preferable for the crosslinked fluororubber article to exhibit a tensile strength at break at 160° C. of not lower than 1 MPa, more preferably not lower than 1.5 MPa, and particularly preferably not lower than 2 MPa, and preferably not higher than 30 MPa, and more preferably not higher than 28 MPa. The tensile strength at break and elongation at break are measured in accordance with JIS-K 6251 using a No. 6 dumbbell.

In addition, in order to be suitable for use in high-temperature environments, it is preferable for the crosslinked fluororubber article to exhibit a tearing strength at 160° C. of 3 to 30 kN/m, more preferably not lower than 4 kN/m and even more preferably not lower than 5 kN/m, and more preferably not higher than 29 kN/m, and even more preferably not higher than 28 kN/m.

In addition, in order to be suitable for use in high-temperature environments, it is preferable for the crosslinked fluororubber article to exhibit an elongation at break at 200° C. of 100 to 700%, more preferably not lower than 110% and even more preferably not lower than 120%, and more preferably not higher than 680% and even more preferably not higher than 650%.

In addition, in order to be suitable for use in high-temperature environments, it is preferable for the crosslinked fluororubber article to exhibit a tensile strength at break at 200° C. of 1 to 30 MPa, more preferably not lower than 1.5 MPa, and particularly preferably not lower than 2 MPa, and preferably not higher than 29 MPa, and more preferably not higher than 28 MPa.

In addition, in order to be suitable for use in high-temperature environments, it is preferable for the crosslinked fluororubber article to exhibit a tearing strength at 200° C. of 3 to 30 kN/m, more preferably not lower than 4 kN/m and even more preferably not lower than 5 kN/m, and more preferably not higher than 29 kN/m, and even more preferably not higher than 28 kN/m.

The above-mentioned fluororubber composition and the above-mentioned crosslinked fluororubber article can be used in a variety of applications, but can be used particularly advantageously in the various applications mentioned below.

(1) Hoses

The hose maybe a hose having a single layer structure comprising only a crosslinked fluororubber article obtained by crosslinking the fluororubber composition of the present invention, but may also be a multilayer hose having a multilayer structure also containing other layers.

Examples of hoses having single layer structures include exhaust gas hoses, EGR hoses, turbocharger hoses, fuel hoses, brake hoses and oil hoses.

Examples of hoses having multilayer structures include exhaust gas hoses, EGR hoses, turbocharger hoses, fuel hoses, brake hoses and oil hoses.

Turbocharger systems are often installed in diesel engines, and are systems whereby exhaust gas from the engine cause a turbine to rotate, thereby driving a compressor that is linked to the turbine, increasing the compression ratio of the air supplied to the engine and increasing the power output of the engine. The turbocharger system, which uses exhaust gas from the engine and achieves a high power output, leads to a reduction in engine size, lower fuel consumption and purification of exhaust gas.

Turbocharger hoses are used in turbocharger systems as hoses for supplying compressed air to the engine. In order to effectively use the space in cramped engine compartments, rubber hoses having excellent flexibility and softness are useful, and it is typical to use hoses having multilayer structures in which a rubber (and especially a fluororubber) layer having excellent thermal aging resistance and oil resistance is used as an inner layer and a silicone rubber or acrylic rubber is used as an outer layer. However, the space around the engine, such as the engine compartment, is subjected to high temperatures and is a harsh environment in which vibration occurs, meaning that it is essential to use a hose that exhibits not only excellent thermal aging resistance, but also excellent mechanical properties at high temperatures.

By using a crosslinked fluororubber layer obtained by crosslinking the fluororubber composition of the present invention as a rubber layer in a single layer structure or multilayer structure, it is possible to provide a turbocharger hose which can satisfy these required properties at a high level and which exhibits excellent properties.

In hoses having multilayer structures other than turbocharger hoses, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers and epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a hose having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

The above-mentioned hoses can be advantageously used in other fields, such as those mentioned below.

The above-mentioned hoses can be used in hoses for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

In the automotive field, the above-mentioned hoses can be used in peripheral equipment for engines and automatic transmissions, and can be used as EGR hoses, exhaust gas hoses, fuel hoses, oil hoses and brake hoses in addition to turbocharger hoses.

In addition, the above-mentioned hoses can also be used in fields such as aviation, rockets, ships, chemical plants, analytical/scientific instruments, food processing plant equipment and atomic power plant equipment.

(2) Sealing Materials

When used as a sealing material, the above-mentioned crosslinked fluororubber article can be advantageously used in fields such as those mentioned below.

For example, the above-mentioned crosslinked fluororubber article can be used in sealing materials such as gaskets and contact or non-contact packing materials, which require heat resistance, oil resistance, fuel oil resistance, resistance to anti-freeze used for engine cooling and steam resistance, in engine bodies, main driving systems, valve systems, lubricating/cooling systems, fuel systems, air intake/exhaust systems for automotive engines; transmission systems for drive systems; chassis steering systems; braking systems; basic electrical components of electrical equipment, electrical components of control systems, electrical components of accessories and the like (self-sealing packings, piston rings, split ring type packings, mechanical seals, oil seals and the like).

Sealing materials used in engine bodies for automotive engines are not particularly limited, but can be, for example, sealing materials such as cylinder head gaskets, cylinder head cover gaskets, oil pan packings, general gaskets, O-rings, packings and timing belt cover gaskets.

Sealing materials used in main driving systems for automotive engines are not particularly limited, but can be, for example, crankshaft seals or camshaft seals.

Sealing materials used in valve systems for automotive engines are not particularly limited, but can be, for example, valve stem oil seals for engine valves and valve seats for butterfly valves.

Sealing materials used in lubricating/cooling systems for automotive engines are not particularly limited, but can be, for example, sealing gaskets for engine oil coolers.

Sealing materials used in fuel systems for automotive engines are not particularly limited, but can be, for example, oil seals for fuel pumps, filler seals for fuel tanks, tank packings and the like, connector O-rings for fuel tubes and the like, injector cushion rings, injector seal rings, injector O rings and the like for fuel injection systems, flange gaskets for carburetors and the like, EGR sealing materials and the like.

Sealing materials used in air intake/exhaust systems for automotive engines are not particularly limited, but can be, for example, intake manifold packings, exhaust manifold packings, throttle body packings and turbocharger turbine shaft seals.

Sealing materials used in transmission systems for automotive engines are not particularly limited, but can be, for example, transmission-related bearing seals, oil seals, O-rings and packings and the like, and O-rings and packings for automatic transmission systems.

Sealing materials used in automotive braking systems are not particularly limited, but can be, for example, oil seals, O-rings, packings and the like, piston cups (rubber cups) for master cylinders and the like, caliper seals, boots and the like.

Sealing materials used in automotive electrical components are not particularly limited, but can be, for example, O-rings and packings for vehicle air conditioning systems.

Sealing materials are particularly suitable as sealing materials for sensors (bushes), and especially sealing materials for oxygen sensors, sealing materials for nitrogen oxide sensors, sealing materials for sulfur oxide sensors and the like. O-rings may also be square rings.

Applications in fields other than the automotive field are not particularly limited, and the sealing material can be widely used in fields such as aviation, rockets, ships, oil well drilling (for example, packer seals, MWD seals, LWD seals and the like), chemical plants, pharmaceutical applications, photographic applications such as developers, printing applications such as printing equipment, coating applications such as coating equipment, analytical/scientific instruments, food processing plant equipment, atomic power plant equipment, iron and steel-related applications such as iron plate processing equipment, general industrial applications, electrical applications, fuel cells, electronic components and forming in place.

For example, the sealing material can be oil-resistant, chemical-resistant, heat-resistant, steam-resistance or weathering-resistant packings, O-rings or other sealing materials in transport-related fields such as shipping or aviation; similar packings, O-rings or sealing materials in the field of oil well drilling; similar packings, O-rings or sealing materials in the field of chemical plants; similar packings, O-rings or sealing materials in the fields of food processing plant equipment and food processing equipment (including domestic equipment); similar packings, O-rings or sealing materials in the field of atomic power plant equipment; and similar packings, O-rings or sealing materials in the field of general industrial equipment.

(3) Belts

The above-mentioned crosslinked fluororubber article can be advantageously used in belts such as those mentioned below.

It is possible to use the fluororubber composition of the present invention for a power transmission belt (including a flat belt, V-belt, V-ribbed belt, toothed belt and the like) or conveyor belt. In addition, the above-mentioned crosslinked fluororubber article can be used for belts for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

Examples of flat belts include flat belts used in high-temperature locations, such as around engines in agricultural equipment, machine tools, industrial equipment and the like. Examples of conveyor belts include conveyor belts used to transport loose materials or granular materials, such as coal, crushed stone, sand, mineral ores and wood chips, in high-temperature environments, conveyor belts used in furnaces in ironworks and the like, and conveyor belts used in applications where exposure to high-temperature environments occurs, such as precision instrument assembly plants, food processing plants and the like. Examples of V-belts and V-ribbed belts include V-belts and V-ribbed belts used in agricultural equipment, general equipment (office automation equipment, printing equipment, industrial dryers and the like) and automotive applications. Examples of toothed belts include toothed belts used in drive belts for delivery robots and drive belts for food processing equipment, machine tools and the like, and toothed belts used in automotive applications, office automation equipment, medical applications, printing equipment and the like. In particular, timing belts are examples of automotive toothed belts.

Moreover, in belts having multilayer structures, examples of layers comprising other materials include layers comprising other types of rubber, layers comprising thermoplastic resins, fiber reinforcing layers, canvas and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a belt having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(4) Rubber Vibration Insulators

By using the above-mentioned crosslinked fluororubber article as a single layer or multilayer rubber layer in a rubber vibration insulator, it is possible to provide an automotive rubber vibration insulator which can satisfy the properties required of a rubber vibration insulator at a high level and which exhibits excellent properties.

In multilayer rubber vibration insulators other than automotive rubber vibration insulators, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a rubber vibration insulator having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(5) Diaphragms

The above-mentioned crosslinked fluororubber article can be advantageously used in diaphragms such as those mentioned below.

In automotive engine applications, for example, the above-mentioned crosslinked fluororubber article can be used as a diaphragm for a fuel system, exhaust system, braking system, drive system or ignition system, where heat resistance, oxidation resistance, fuel resistance, low gas permeability and the like are required.

Examples of diaphragms used in automotive engine fuel systems include diaphragms for fuel pumps, diaphragms for carburetors, diaphragms for pressure regulators, diaphragms for pulsation dampers, ORVR diaphragms, diaphragms for canisters and diaphragms for auto fuel cocks.

Examples of diaphragms used in automotive engine exhaust systems include diaphragms for waste gates, diaphragms for actuators and EGR diaphragms.

Examples of diaphragms used in automotive engine braking systems include diaphragms for air brakes.

Examples of diaphragms used in automotive engine drive systems include oil pressure diaphragms.

Examples of diaphragms used in automotive engine ignition systems include diaphragms for distributors.

Examples of applications other than in automotive engines include diaphragms for ordinary pumps, diaphragms for valves, diaphragms for filter presses, diaphragms for blowers, diaphragms for air conditioning equipment, diaphragms for control equipment, diaphragms for water feed systems, diaphragms used in pumps used to supply hot water, diaphragms for high temperature steam, diaphragms for semiconductor manufacturing (for example, diaphragms for transporting chemicals used in manufacturing processes), diaphragms for food processing equipment, diaphragms for liquid storage tanks, diaphragms for pressure switches, diaphragms used in oil exploration/oil well drilling (for example, diaphragms used to supply lubricating oils for oil well drilling bits and the like), diaphragms for gas appliances such as gas-fired instantaneous water heater and gas meters, diaphragms for accumulators, diaphragms for suspension air springs and the like, diaphragms for screw feeders of boats and ships and diaphragms for artificial hearts, for which heat resistance, oil resistance, chemical resistance, steam resistance and low gas permeability are required.

(6) Hollow Rubber Formed Products

The above-mentioned crosslinked fluororubber article can also be advantageously used in hollow rubber formed products.

Examples of the above-mentioned hollow rubber formed products include bladders, formed products having bellows-like structures and primer bulbs.

(6-1) Bladders

The above-mentioned crosslinked fluororubber article can be advantageously used in a bladder used in a tire vulcanizing process or molding process (a bladder for tire manufacturing).

In tire manufacturing processes, the types of bladder used are generally divided into two types, namely tire molding bladders, which are used when molding a green tire (unvulcanised tire) after assembling the various constituent components of the tire, and tire vulcanization bladders, which are used in order to impart the shape of the finished tire product during vulcanization.

The above-mentioned crosslinked fluororubber article can be used in both tire molding bladders and tire vulcanization bladders, but is preferably used in tire vulcanization bladders, which are repeatedly used under hot conditions and which require excellent heat resistance and tensile properties at high temperatures.

(6-2) Formed Products Having Bellows-Like Structures

A bellows-like structure is, for example, a structure having protrusions and/or recesses in the circumferential direction of a cylinder, and the shape of the protrusions and recesses may be a curved wave-like shape or a triangular wave shape.

Specific examples of formed products having bellows-like structures include joint members such as flexible joints and expansion joints, boots and grommets.

Joint members are joints used in pipes and piping equipment, and are used in applications such as preventing vibration and noise emanating from piping systems, absorbing expansion/contraction or displacement caused by fluctuations in temperature or pressure, absorbing dimensional fluctuations and ameliorating and preventing the effects of earthquakes and ground subsidence.

Flexible joints and expansion joints can be advantageously used for, for example, piping for shipbuilding, piping for pumps, compressors and the like, piping for chemical plants, electric piping, piping for civil engineering/water and automotive piping.

Boots are preferably used in a variety of industries, for example automotive boots such as constant velocity joint boots, dust covers, rack and pinion steering boots, pin boots and piston boots, boots for agricultural equipment, boots for industrial vehicles, boots for construction equipment, boots for hydraulic equipment, boots for pneumatic equipment, boots for centralized lubrication equipment, boots for transporting liquids, boots for firefighting equipment and boots for transporting a variety of liquefied gases.

(6-3) Primer Bulbs

Figure 2:
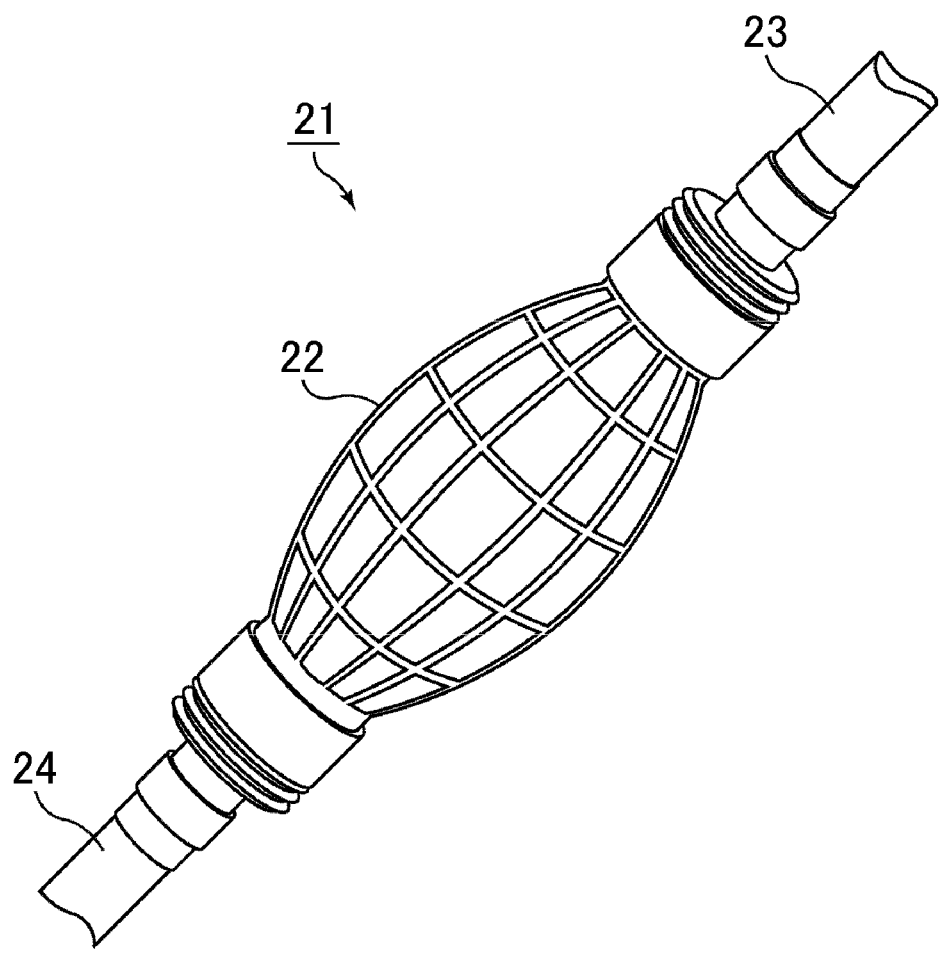
FIG. 2 is a schematic view showing one example of the shape of a primer bulb.

A primer bulb is a pump for supplying fuel to a carburetor (a float chamber in a carburetor) so that an engine can be easily started. A primer bulb has a single protrusion in the circumferential direction of a cylinder, and the shape of the protrusion is a curved wave-like shape. The shape of the primer bulb is, for example, the shape shown in FIG. 2, and the primer bulb 21 is generally disposed between a hose 23 on the exhaust side (engine side) and a hose 24 on the intake side (fuel tank side).

Examples of the above-mentioned primer bulb include primer bulbs used in vehicles, boats and ships, aircraft, construction equipment, agricultural equipment and mining equipment. For example, the above-mentioned primer bulb is particularly useful as a primer bulb for boats and ships.

(7) Fluororubber Coating Material Compositions

The fluororubber composition of the present invention can also be used as a fluororubber coating material composition. A coating film obtained from the above-mentioned fluororubber coating material composition exhibits excellent tensile properties at high temperatures, and therefore does not break under high-temperature conditions.

The above-mentioned fluororubber coating material composition is preferably one in which the fluororubber composition of the present invention is dissolved or dispersed in a liquid medium. In cases where the fluororubber composition of the present invention is used in a fluororubber coating material composition, the fluororubber composition preferably further contains at least a polyol crosslinking agent or polyamine crosslinking agent in addition to the above-mentioned fluororubber (A) and carbon black (B). Particularly, the composition preferably contains a polyamine crosslinking agent.

The above-mentioned fluororubber coating material composition can be prepared by dissolving or dispersing the fluororubber composition, which is obtained by mixing the components that constitute the fluororubber composition by means of, for example, the above-mentioned method, in a liquid medium such as a ketone, ester or ether.

The above-mentioned fluororubber coating material composition may be coated directly on a substrate comprising a metal, glass, resin, rubber and the like, or coated on a substrate after a primer layer is formed on the substrate from an epoxy coating material and the like. Furthermore, another coating film (a top coat layer) may be formed on the coating film obtained from the above-mentioned fluororubber coating material composition.

A coating film obtained from the above-mentioned fluororubber coating material composition can be used in, for example, a sheet or belt; a sealant for a cylindrical member; a pre-coated metal; a packing rubber, O-ring, diaphragm, chemical-resistant tube, chemical stopper, fuel hose, valve seal, chemical plant gasket or engine gasket; a roll (for example, a fixing roll or contact bonding roll) for office automation equipment such as a copier, printer or fax machine, a conveyor belt and the like. The above-mentioned engine gasket can be, for example, a head gasket for an automotive engine and the like.

(8) Wire Coating Materials

The fluororubber composition can also be advantageously used in an insulating coating material for wires or a sheath material that forms a sheath layer on the outer periphery of an insulating layer of a wire, for which heat resistance and softness (flexibility) are required, and can give a coating film having excellent flexibility at high temperatures.

The above-mentioned insulating coating material or sheath material can be an insulating coating material or sheath material used for heat-resistant wires in automobiles, aircraft, military vehicles and the like, for which heat resistance is particularly required. Of these, the above-mentioned insulating coating material or sheath material is suitable as an insulating coating material or sheet material used in coated wires that are used in environments where the wires come into contact with transmission oil or engine oil of an internal combustion engine or inside automatic transmission systems or engine oil pans of vehicles.

(9) Biodiesel Fuel-Resistant Members (BDF-Resistant Members)

The above-mentioned crosslinked fluororubber article can also be advantageously used in members that come into contact with diesel fuel from biological sources, that is, biodiesel fuels (BDF). Biodiesel fuel includes fuel for diesel engines that is obtained by processing and/or refining a biomass raw material.

In cases where the above-mentioned crosslinked fluororubber article is used in a BDF-resistant member, if the above-mentioned crosslinked fluororubber article contains an acid acceptor, the acid acceptor reacts with the BDF, thereby swelling the crosslinked fluororubber article and raising concerns regarding deterioration, and it is therefore preferable for the above-mentioned crosslinked fluororubber article not to contain an acid acceptor in such cases. In other words, in cases where a crosslinked article obtained from the fluororubber composition of the present invention is used in a BDF-resistant member, it is preferable not to blend an acid acceptor in the fluororubber composition.

The above-mentioned biodiesel fuel-resistant member can be used in a variety of applications where contact with BDF occurs, for example, films, sheets, hoses such as vehicle fuel hoses and oil filler hoses, underground tubes for gasoline stations, bottles such as tanks for vehicle fuel, containers, tanks, automotive seals such as diaphragms, packings, flange gaskets for carburetors and O-rings for fuel pumps, and a variety of mechanical seals such as seals for hydraulic equipment.

Of these, the above-mentioned biodiesel fuel-resistant member is preferably a hose or sealing material, and more preferably a hose.

Among the above articles, the crosslinked fluororubber article obtained from the fluororubber composition of the present invention is particularly preferably used for a bladder for tire manufacturing. That is, the crosslinked fluororubber article obtained from the fluororubber composition of the present invention is preferably used for a bladder for tire manufacturing.

A bladder for tire manufacturing formed of the crosslinked fluororubber article is also one aspect of the present invention.

EXAMPLES

The present invention will now be explained through the use of examples, but the present invention is not limited only to these examples.

The methods for measuring the various physical properties used in the present invention are as follows.

(1) Modulus of Shearing Elasticity (G')

Methods for measuring the modulus of shearing elasticity at a dynamic strain of 1% (G'(1%)), the modulus of shearing elasticity at a dynamic strain of 100% (G'(100%)), and the difference $\delta G'$ (G' (1%)-G' (100%))

The dynamic viscoelasticity is measured using a rubber process analyzer (RPA 2000, manufactured by Alpha Technologies) under conditions of 100° C. and 1 Hz.

(2) Mooney Viscosity ($ML_{1+10}$ (100° C.))

The Mooney viscosity is measured in accordance with JIS K6300. The measurement temperature is 100° C.

(3) Tensile Fatigue Test

In accordance with JIS-K 6270 and using a No. 6 dumbbell, a repeated tensile strain is applied at a distortion of 60 mm, a frequency of 2 Hz, a temperature of 150° C. and a chuck interval of 50 mm, and the number of cycles until the dumbbell breaks is counted. The measurement is carried out a maximum of 10,000 times.

(4) Tensile Strength at Break and Elongation at Break

The test equipment used is a "Tensilon" RTG-1310 manufactured by A & D and a "Strograph" TH-200D manufactured by Toyo Seiki Seisaku-sho. The tensile strength at break and elongation at break are measured in accordance with JIS-K 6251, using a No. 6 dumbbell, a chuck gap of 50 mm and a rate of pulling of 500 mm/min. The measurement temperatures are 25° C. and 160° C.

The following fluororubber, carbon black, crosslinking agent, crosslinking accelerator, processing aid and acid acceptor were used in the examples.

(Carbon Black 1)

ISAF ($N_2SA$=119 $m^2$/g, DBP absorption=114 ml/100 g). "Seast 6" (trade name), manufactured by Tokai Carbon.

(Carbon Black 2)

HAF ($N_2SA$=79 $m^2$/g, DBP absorption=101 ml/100 g). "Seast 3" (trade name), manufactured by Tokai Carbon.

(Crosslinking Agent)

2,5-dimethyl-2,5-di(t-butylperoxy)hexane. "Perhexa 25B" (trade name), manufactured by NOF Corporation (Crosslinking Accelerator)

Triallyl isocyanurate (TRIC). "TRIC" (trade name), manufactured by Nippon Kasei Chemical Co., Ltd.

(Processing Aids)

Stearyl amine (Farmin 86T) (manufactured by Kao Corporation)

(Acid Acceptor)

Zinc oxide (#1) (manufactured by Sakai Chemical Industry Co., Ltd.)

(Fluororubber A1)

A1: 1.7 L of pure water, 0.17 g of a 50% aqueous solution of $CH_2$=$CFCF_2OCF(CF_3)CF_2OCF(CF_3)COONH_4$ and 6.8 g of a 50% aqueous solution of $F(CF_2)_5COONH_4$ were placed in a 3 L stainless steel autoclave, which was then thoroughly purged with nitrogen gas. After increasing the temperature to 80° C. while stirring at 600 rpm, monomers were injected under pressure so that the initial monomer composition in the tank was VdF/HFP=34/66 (molar ratio) and the pressure was 1.52 MPa. Next, a polymerization initiator solution obtained by dissolving 60 mg of ammonium persulfate (APS) in 5 mL of pure water was injected under nitrogen gas pressure, thereby starting a reaction. At the point where the internal pressure dropped to 1.42 MPa due to the polymerization progressing, a monomer mixture comprising VdF/HFP (68/32 molar ratio) was injected under pressure until the internal pressure reached 1.52 MPa. At this point, 1.96 g of the diiodine compound $I(CF_2)_4I$ was injected under pressure. While the pressure was repeatedly increased and decreased, an aqueous solution of 60 mg of APS/5 ml of pure water was injected under nitrogen gas pressure every 3 hours, thereby allowing the polymerization reaction to continue. At the point where 600 g of the monomer mixture had been added, unreacted monomer was discharged, the autoclave was cooled, and 2346 g of a fluororubber dispersion having a solid content concentration of 26.3 mass % was obtained. The polymerization time was 7.9 hours. The copolymer composition of this fluororubber was investigated by means of NMR analysis, and found to have a VdF/HFP ratio of 68/32 (molar ratio) and a Mooney viscosity ($ML_{1+10}$ (100° C.)) of 69. This fluororubber was used as fluororubber A1.

(Fluororubber A2)

A2: 1.7 L of pure water, 0.17 g of a 50% aqueous solution of $CH_2$=$CFCF_2OCF(CF_3)CF_2OCF(CF_3)COONH_4$ and 6.8 g of a 50% aqueous solution of $F(CF_2)_5COONH_4$ were placed in a 3 L stainless steel autoclave, which was then thoroughly purged with nitrogen gas. After increasing the temperature to 80° C. while stirring at 600 rpm, monomers were injected under pressure so that the initial monomer composition in the tank was VdF/HFP=45/55 (molar ratio) and the pressure was 1.52 MPa. Next, a polymerization initiator solution obtained by dissolving 60 mg of APS in 5 mL of pure water was injected under nitrogen gas pressure, thereby starting a reaction. At the point where the internal pressure dropped to 1.42 MPa due to the polymerization progressing, a monomer mixture comprising VdF/HFP (76/24 molar ratio) was injected under pressure until the internal pressure reached 1.52 MPa. At this point, 1.96 g of the diiodine compound I(CF$_2$)$_4$I was injected under pressure. While the pressure was repeatedly increased and decreased, an aqueous solution of 60 mg of APS/5 ml of pure water was injected under nitrogen gas pressure every 3 hours, thereby allowing the polymerization reaction to continue. At the point where 600 g of the monomer mixture had been added, unreacted monomer was discharged, the autoclave was cooled, and 2361 g of a fluororubber dispersion having a solid content concentration of 26.6 mass % was obtained. The polymerization time was 7.5 hours. The copolymer composition of this fluororubber was investigated by means of NMR analysis, and found to have a VdF/HFP ratio of 76/24 (molar ratio) and a Mooney viscosity (ML$_{1+10}$ (100° C.)) of 89. This fluororubber was used as fluororubber A2.

(Fluororubber A3)

A3: 1.7 L of pure water, 0.17 g of a 50% aqueous solution of CH$_2$=CFCF$_2$OCF(CF$_3$)CF$_2$OCF(CF$_3$)COONH$_4$ and 6.8 g of a 50% aqueous solution of F(CF$_2$)$_5$COONH$_4$ were placed in a 3 L stainless steel autoclave, which was then thoroughly purged with nitrogen gas. After increasing the temperature to 80° C. while stirring at 600 rpm, monomers were injected under pressure so that the initial monomer composition in the tank was VdF/HFP=59/41 (molar ratio) and the pressure was 1.52 MPa. Next, a polymerization initiator solution obtained by dissolving 60 mg of APS in 5 mL of pure water was injected under nitrogen gas pressure, thereby starting a reaction. At the point where the internal pressure dropped to 1.42 MPa due to the polymerization progressing, a monomer mixture comprising VdF/HFP (84/16 molar ratio) was injected under pressure until the internal pressure reached 1.52 MPa. At this point, 1.96 g of the diiodine compound I(CF$_2$)$_4$I was injected under pressure. While the pressure was repeatedly increased and decreased, an aqueous solution of 60 mg of APS/5 ml of pure water was injected under nitrogen gas pressure every 3 hours, thereby allowing the polymerization reaction to continue. At the point where 600 g of the monomer mixture had been added, unreacted monomer was discharged, the autoclave was cooled, and 2352 g of a fluororubber dispersion having a solid content concentration of 26.7 mass % was obtained. The polymerization time was 7.4 hours. The copolymer composition of this fluororubber was investigated by means of NMR analysis, and found to have a VdF/HFP ratio of 84/16 (molar ratio) and a Mooney viscosity (ML$_{1+10}$ (100° C.)) of 93. This fluororubber was used as fluororubber A3.

(Fluororubber A4)

A4: 3.9 L of pure water, 3.12 g of a 50% aqueous solution of CH$_2$=CFCF$_2$OCF(CF$_3$)CF$_2$OCF(CF$_3$)COONH$_4$ and 15.6 g of a 50% aqueous solution of F(CF$_2$)$_5$COONH$_4$ were placed in a 6 L stainless steel autoclave, which was then thoroughly purged with nitrogen gas. After increasing the temperature to 80° C. while stirring at 600 rpm, monomers were injected under pressure so that the initial monomer composition in the tank was VdF/2,3,3,3-tetrafluoro propylene=92/8 (molar ratio) and the pressure was 1.46 MPa. Next, a polymerization initiator solution obtained by dissolving 160 mg of APS in 5 mL of pure water was injected under nitrogen gas pressure, thereby starting a reaction. At the point where the internal pressure dropped to 1.42 MPa due to the polymerization progressing, a monomer mixture comprising VdF/2,3,3,3-tetrafluoro propylene (68/32 molar ratio) was injected under pressure until the internal pressure reached 1.52 MPa. At the point where 34 g of the monomer mixture had been added after the pressure was repeatedly increased and decreased, 5.37 g of the diiodine compound I(CF$_2$)$_4$I was injected under pressure. While the pressure was repeatedly increased and decreased, an aqueous solution of 160 mg of APS/5 ml of pure water was injected under nitrogen gas pressure every 3 hours, thereby allowing the polymerization reaction to continue. At the point where 1386 g of the monomer mixture had been added, unreacted monomer was discharged, the autoclave was cooled, and 5309 g of a fluororubber dispersion having a solid content concentration of 26.0 mass % was obtained. The polymerization time was 8.2 hours. The copolymer composition of this fluororubber was investigated by means of NMR analysis, and found to have a VdF/2,3,3,3-tetrafluoro propylene ratio of 71/29 (molar ratio) and a Mooney viscosity (ML$_{1+10}$ (100° C.)) of 49. This fluororubber was used as fluororubber A4.

(Fluororubber A5)

A5: 1.5 L of pure water, 1.20 g of a 50% aqueous solution of CH$_2$=CFCF$_2$OCF(CF$_3$)CF$_2$OCF(CF$_3$)COONH$_4$ and 6.0 g of a 50% aqueous solution of F(CF$_2$)$_5$COONH$_4$ were placed in a 3 L stainless steel autoclave, which was then thoroughly purged with nitrogen gas. After increasing the temperature to 80° C. while stirring at 600 rpm, monomers were injected under pressure so that the initial monomer composition in the tank was VdF/2,3,3,3-tetrafluoro propylene=97/3 (molar ratio) and the pressure was 1.46 MPa. Next, a polymerization initiator solution obtained by dissolving 80 mg of APS in 5 mL of pure water was injected under nitrogen gas pressure, thereby starting a reaction. At the point where the internal pressure dropped to 1.42 MPa due to the polymerization progressing, a monomer mixture comprising VdF/2,3,3,3-tetrafluoro propylene (76/24 molar ratio) was injected under pressure until the internal pressure reached 1.52 MPa. At the point where 13 g of the monomer mixture had been added after the pressure was repeatedly increased and decreased, 2.07 g of the diiodine compound I(CF$_2$)$_4$I was injected under pressure. While the pressure was repeatedly increased and decreased, an aqueous solution of 30 mg of APS/5 ml of pure water was injected under nitrogen gas pressure every 3 hours, thereby allowing the polymerization reaction to continue. At the point where 530 g of the monomer mixture had been added, unreacted monomer was discharged, the autoclave was cooled, and 2099 g of a fluororubber dispersion having a solid content concentration of 26.2 mass % was obtained. The polymerization time was 10.1 hours. The copolymer composition of this fluororubber was investigated by means of NMR analysis, and found to have a VdF/2,3,3,3-tetrafluoro propylene ratio of 78/22 (molar ratio) and a Mooney viscosity (ML$_{1+10}$ (100° C.)) of 43. This fluororubber was used as fluororubber A5.

(Fluororubber A6)

A6: 1.7 L of pure water, 0.17 g of a 50% aqueous solution of CH$_2$=CFCF$_2$OCF(CF$_3$)CF$_2$OCF(CF$_3$)COONH$_4$ and 6.8 g of a 50% aqueous solution of F (CF$_2$)$_5$COONH$_4$ were placed in a 3 L stainless steel autoclave, which was then thoroughly purged with nitrogen gas. After increasing the temperature to 80° C. while stirring at 600 rpm, monomers were injected under pressure so that the initial monomer composition in the tank was VdF/PMVE=75/25 (molar ratio) and the pressure was 1.52 MPa. Next, a polymerization initiator solution obtained by dissolving 30 mg of APS in 5 mL of pure water was injected under nitrogen gas pressure, thereby starting a reaction. At the point where the internal pressure dropped to 1.42 MPa due to the polymerization progressing, a monomer mixture comprising VdF/PMVE (75/25 molar ratio) was injected under pressure until the internal pressure reached 1.52 MPa. At this point, 2.72 g of the diiodine compound $I(CF_2)_4I$ was injected under pressure. While the pressure was repeatedly increased and decreased, an aqueous solution of 30 mg of APS/5 ml of pure water was injected under nitrogen gas pressure every 3 hours, thereby allowing the polymerization reaction to continue. At the point where 600 g of the monomer mixture had been added, unreacted monomer was discharged, the autoclave was cooled, and 2337 g of a fluororubber dispersion having a solid content concentration of 26.1 mass % was obtained. The polymerization time was 6.6 hours. The copolymer composition of this fluororubber was investigated by means of NMR analysis, and found to have a VdF/PMVE ratio of 77/23 (molar ratio) and a Mooney viscosity ($ML_{1+10}$ (100° C.)) of 57. This fluororubber was used as fluororubber A6.

Example 1

Using a mixer (Mix Labo 0.5 L (manufactured by Moriyama), rotor diameter: 6.6 cm, tip clearance: 0.05 cm), 20 parts by mass of the carbon black 1, 0.5 parts by mass of stearylamine, and 1.0 part by mass of zinc oxide were mixed with 100 parts by mass of fluororubber (A1) at a front rotor rotation frequency of 60 rpm and a back rotor rotation frequency of 50 rpm. The temperature of the mixed product discharged from the mixer was 165° C. This mixed product was cooled to a temperature of 100° C. or lower using an 8 inch open roll mixer adjusted to 25° C., mixed and then discharged. A fluororubber precompound B1 was obtained by aging the resulting cooled and mixed product at 25° C. for 24 hours. The fluororubber precompound B1 had a modulus of shearing elasticity (G'(1%)) of 757 kPa and a difference 6G' (G' (1%)-G' (100%) between the modulus of shearing elasticity (G'(1%)) and the modulus of shearing elasticity (G'(100%)) of 568 kPa.

Using an 8 inch open roll mixer (manufactured by Kansai Roll Co., Ltd.), 1.0 part by mass of a crosslinking agent, 0.5 parts by mass of a crosslinking accelerator and 0.5 part by mass of stearylamine were mixed for 15 minutes with 121.5 parts by mass of a fluororubber precompound (B1) at a roll temperature of 25° C., a front roll rotation frequency of 21 rpm, a back roll rotation frequency of 19 rpm and an inter-roll gap of 0.1 cm, thereby obtaining fluororubber precompound (C1). The temperature of the mixed product discharged from the open roll mixer was 70° C.

The fluororubber precompound (C1) was crosslinked by being pressed at 160° C. for 30 minutes, thereby obtaining a sheet-like test piece having a thickness of 2 mm. Test pieces (JIS No. 6 dumbbells) were prepared from the sheet, and these test pieces were measured for tensile strength at break and elongation at break at 25° C. and 160° C. and also subjected to a tensile fatigue test at 150° C. The results are shown in Table 1.

Example 2

Various physical properties were measured as in Example 1 except that the fluororubber (A2) was used instead of the fluororubber (A1). Table 1 shows the results.

Reference Example 1

Various physical properties were measured as in Example 1 except that the fluororubber (A3) was used instead of the fluororubber (A1). Table 1 shows the results.

Example 3

Various physical properties were measured as in Example 1 except that the fluororubber (A4) was used instead of the fluororubber (A1). Table 2 shows the results.

Example 4

Various physical properties were measured as in Example 1 except that the fluororubber (A5) was used instead of the fluororubber (A1). Table 2 shows the results.

Example 5

Various physical properties were measured as in Example 1 except that the fluororubber (A6) was used instead of the fluororubber (A1). Table 2 shows the results.

Example 6

Various physical properties were measured as in Example 1 except that the fluororubber (A2) was used instead of the fluororubber (A1) and the carbon black 2 was used instead of the carbon black 1. Table 2 shows the results.

TABLE 1

|  | Example 1 | Example 2 | Reference Example 1 |
|---|---|---|---|
| Composition of fluororubber precompound (part by mass) | | | |
| Fluororubber(A1) | 100 | | |
| Fluororubber(A2) | | 100 | |
| Fluororubber(A3) | | | 100 |
| Carbon black 1 | 20 | 20 | 20 |
| Zinc oxide | 1 | 1 | 1 |
| Stearylamine | 0.5 | 0.5 | 0.5 |
| Maximum temperature of mixed product discharged (° C.) | 165 | 169 | 166 |
| Dynamic viscoelasticity test | | | |
| G' 1%(kPa) | 757 | 795 | 747 |
| Difference δG' (kPa) | 568 | 574 | 523 |
| Composition of fluororubber full compound (part by mass) | | | |
| Fluororubber precompound(B1) | 121.5 | | |
| Fluororubber precompound(B2) | | 121.5 | |
| Fluororubber precompound(B3) | | | 121.5 |
| TAIC | 0.5 | 0.5 | 0.5 |
| Crosslinking agent | 1.0 | 1.0 | 1.0 |
| Stearylamine | 0.5 | 0.5 | 0.5 |
| Maximum temperature of mixed product discharged (° C.) | 70 | 71 | 74 |
| Conditions of cross-linking by pressing | 160° C., 30 min | 160° C., 30 min | 160° C., 30 min |
| Mechanical properties of crosslinked article Measurement temperature 25° C. | | | |
| Tensile strength at break (MPa) | 15.7 | 20.1 | 22.0 |
| Elongation at break (%) | 742 | 763 | 599 |
| Measurement temperature 160° C. | | | |
| Tensile strength at break (MPa) | 3.1 | 3.9 | 4.3 |
| Elongation at break (%) | 440 | 438 | 405 |
| Tensile fatigue test | | | |
| Measurement temperature 150° C. | 3300 | 1944 | 1360 |

TABLE 2

|  | Example 3 | Example 4 | Example 5 | Example 6 |
|---|---|---|---|---|
| Composition of fluororubber precompound (part by mass) |  |  |  |  |
| Fluororubber(A2) |  |  |  | 100 |
| Fluororubber(A4) | 100 |  |  |  |
| Fluororubber(A5) |  | 100 |  |  |
| Fluororubber(A6) |  |  | 100 |  |
| Carbon black 1 | 20 | 20 | 20 |  |
| Carbon black 2 |  |  |  | 20 |
| Zinc oxide | 1 | 1 | 1 | 1 |
| Stearylamine | 0.5 | 0.5 | 0.5 | 0.5 |
| Maximum temperature of mixed product discharged (° C.) | 169 | 153 | 158 | 152 |
| Dynamic viscoelasticity test |  |  |  |  |
| G' 1%(kPa) | 549 | 553 | 604 | 580 |
| Difference δG' (kPa) | 434 | 414 | 452 | 430 |
| Composition of fluororubber full compound (part by mass) |  |  |  |  |
| Fluororubber precompound(B4) | 121.5 |  |  |  |
| Fluororubber precompound(B5) |  | 121.5 |  |  |
| Fluororubber precompound(B6) |  |  | 121.5 |  |
| Fluororubber precompound(B7) |  |  |  | 121.5 |
| TAIC | 0.5 | 0.5 | 0.5 | 0.5 |
| Crosslinking agent | 1.0 | 1.0 | 1.0 | 1.0 |
| Stearylamine | 0.5 | 0.5 | 0.5 | 0.5 |
| Maximum temperature of mixed product discharged (° C.) | 72 | 68 | 69 | 67 |
| Conditions of cross-linking by pressing | 160° C., 30 min | 160° C., 30 min | 160° C., 30 min | 160° C., 30 min |
| Mechanical properties of crosslinked article |  |  |  |  |
| Measurement temperature 25° C. |  |  |  |  |
| Tensile strength at break (MPa) | 15.5 | 20.2 | 18.7 | 14.7 |
| Elongation at break (%) | 980 | 840 | 570 | 820 |
| Measurement temperature 160° C. |  |  |  |  |
| Tensile strength at break (MPa) | 3.7 | 4.5 | 2.7 | 4.3 |
| Elongation at break (%) | 569 | 470 | 225 | 330 |
| Tensile fatigue test |  |  |  |  |
| Measurement temperature 150° C. | 6820 | 6470 | 760 | 1120 |

EXPLANATION OF SYMBOLS

10: Open roll mixer
11: First roll
12: Second roll
13: Intermediate composition
14: Composition rolled into sheet
21: Primer bulb
22: Projecting part
23: Hose 23 on exhaust side (engine side)
24: Hose 24 on intake side (fuel tank side)

The invention claimed is:

1. A fluororubber composition comprising:
   a fluororubber (A); and
   a carbon black (B), the fluororubber (A) being a vinylidene fluoride-based fluororubber comprising a structural unit derived from vinylidene fluoride (VdF unit) and a structural unit derived from 2,3,3,3-tetrafluoro propylene,
   the molar ratio of the VdF unit to the structural unit derived from 2,3,3,3-tetrafluoro propylene being 50/50 to 78/22,
   wherein the fluororubber composition has a difference δG' (G' (1%)-G' (100%)) of not lower than 120 kPa and not higher than 3,000 kPa, where G' (1%) denotes a modulus of shearing elasticity at a dynamic strain of 1%, G' (100%) denotes a modulus of shearing elasticity at a dynamic strain of 100%, and G' (1%) and G' (100%) are determined by a dynamic viscoelasticity test carried out on an unvulcanised rubber with a rubber process analyzer (RPA) in a condition that the measurement frequency is 1 Hz and the measurement temperature is 100° C., and
   the Mooney viscosity at 100° C. of the fluororubber (A) is 43 to 200.

2. The fluororubber composition according to claim 1, which contains 5 to 65 parts by mass of the carbon black (B) relative to 100 parts by mass of the fluororubber (A).

3. The fluororubber composition according to claim 1, wherein the carbon black (B) has a nitrogen adsorption specific surface area ($N_2SA$) of 25 to 180 $m^2/g$ and a dibutyl phthalate (DBP) absorption of 40 to 180 ml/100 g.

4. The fluororubber composition according to claim 1, which further contains a crosslinking agent (C).

5. A crosslinked fluororubber article obtainable by crosslinking of the fluororubber composition according to claim 1.

6. A bladder for tire manufacturing comprising the crosslinked fluororubber article according to claim 5.

* * * * *